United States Patent
Hamanaka et al.

(10) Patent No.: US 10,176,586 B2
(45) Date of Patent: Jan. 8, 2019

(54) IMAGE GENERATION SYSTEM, IMAGE GENERATION METHOD, AND INFORMATION STORAGE MEDIUM

(71) Applicant: BANDAI NAMCO ENTERTAINMENT INC., Tokyo (JP)

(72) Inventors: Yuta Hamanaka, Singapore (SG); Andrew Hsieh, Fremont, CA (US)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/361,987

(22) Filed: Nov. 28, 2016

(65) Prior Publication Data

US 2017/0161909 A1    Jun. 8, 2017

(30) Foreign Application Priority Data

Dec. 3, 2015    (JP) .................................. 2015-236497

(51) Int. Cl.
| | |
|---|---|
| *A63F 9/24* | (2006.01) |
| *G06T 7/20* | (2017.01) |
| *A63F 13/211* | (2014.01) |
| *A63F 13/25* | (2014.01) |
| *G06T 1/20* | (2006.01) |
| *G06T 15/08* | (2011.01) |

(Continued)

(52) U.S. Cl.
CPC .............. *G06T 7/20* (2013.01); *A63F 13/211* (2014.09); *A63F 13/25* (2014.09); *G06T 1/20* (2013.01); *G06T 15/08* (2013.01); *G06T 15/205* (2013.01); *A63F 2300/8082* (2013.01); *G06T 13/60* (2013.01); *G06T 2210/56* (2013.01)

(58) Field of Classification Search
CPC .................................. G06T 7/20; A63F 13/57
See application file for complete search history.

(56) References Cited

U.S. PATENT DOCUMENTS

| | | | | |
|---|---|---|---|---|
| 6,580,430 | B1 * | 6/2003 | Hollis | .................. G06T 15/005 345/419 |
| 2002/0045470 | A1 * | 4/2002 | Atsumi | .................. A63F 13/10 463/1 |

(Continued)

FOREIGN PATENT DOCUMENTS

JP    2009053886 A    3/2009

*Primary Examiner* — Steve Rowland
(74) *Attorney, Agent, or Firm* — Oliff PLC

(57) ABSTRACT

An image generation system includes a processor including hardware, the processor being configured to implement: an object space setting process that performs a process that places a plurality of objects including a moving object in an object space; a moving object calculation process that performs a movement process that moves the moving object in the object space; and a parameter process that performs a process that sets at least one of an attack parameter, a defense parameter, and a movement control parameter of the moving object based on at least one of density information about an assemblage of particles within a line or a range that extends from the moving object in a given direction, and the density information about the assemblage of particles at a position of the moving object; and an image generation process that generates an image viewed from a given viewpoint in the object space.

18 Claims, 18 Drawing Sheets

(51) Int. Cl.
*G06T 15/20* (2011.01)
*G06T 13/60* (2011.01)

(56) References Cited

U.S. PATENT DOCUMENTS

| | | | | |
|---|---|---|---|---|
| 2004/0032409 A1* | 2/2004 | Girard | ............... | G06T 15/60 |
| | | | | 345/426 |
| 2004/0157662 A1* | 8/2004 | Tsuchiya | ............ | A63F 13/10 |
| | | | | 463/32 |
| 2006/0287027 A1* | 12/2006 | Hardisty | ............ | A63F 13/10 |
| | | | | 463/8 |

* cited by examiner

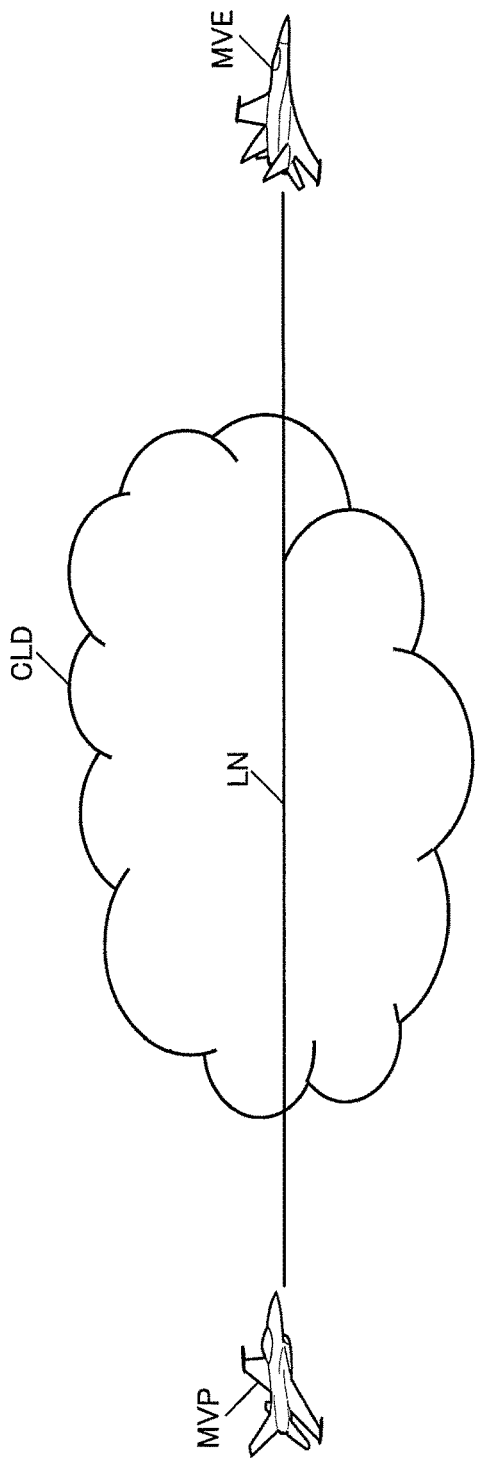

FIG. 13A

| LEFT TURN | FORWARD MOVEMENT | RIGHT TURN |
|---|---|---|
| 20% | 60% | 20% |

FIG. 13B

| LEFT TURN | FORWARD MOVEMENT | RIGHT TURN |
|---|---|---|
| 45% | 10% | 45% |

FIG. 13C

| LEFT TURN | FORWARD MOVEMENT | RIGHT TURN |
|---|---|---|
| 5% | 35% | 60% |

| LEFT TURN | FORWARD MOVEMENT | RIGHT TURN |
|---|---|---|
| 80% | 10% | 10% |

IMAGE GENERATION SYSTEM, IMAGE GENERATION METHOD, AND INFORMATION STORAGE MEDIUM

Japanese Patent Application No. 2015-236497 filed on Dec. 3, 2015, is hereby incorporated by reference in its entirety.

BACKGROUND

The present invention relates to an image generation system, an image generation method, an information storage medium, and the like.

A known image generation system may be configured to generate an image viewed from a given viewpoint in an object space in which an object (e.g., moving object) is placed. Such an image generation system is very popular as a system that makes it possible to experience virtual reality. For example, when the image generation system is designed to implement a fighter aircraft game, the player enjoys the game by operating a player's fighter aircraft (that imitates a fighter aircraft) so as to fly in the object space and attack the attack target (e.g., enemy fighter aircraft or enemy's position).

It is desired for such an image generation system to render (display or implement) an image with higher quality. For example, it is desirable that such an image generation system be able to render (display or implement) a realistic image of clouds that are suspended in air. For example, JP-A-2009-53886 discloses a related-art image generation system that generates an image of clouds. According to the technology disclosed in JP-A-2009-53886, a plurality of billboard polygons (e.g., a billboard polygon for a distant view and a billboard polygon for a near view) are placed in the object space, and an image of clouds is drawn on each billboard polygon to generate a realistic image of clouds.

However, a known image generation system is configured so that clouds are merely displayed within the game screen in the form of an image. Specifically, a known image generation system is configured so that an assemblage of particles such as a cloud does not affect the attack capability, the defense capability, or the moving capability of a moving object (e.g., player's fighter aircraft or enemy fighter aircraft).

SUMMARY

According to one aspect of the invention, there is provided image generation system comprising: a processor comprising hardware, the processor being configured to implement: an object space setting process that performs a process that places a plurality of objects including a moving object in an object space; a moving object calculation process that performs a movement process that moves the moving object in the object space; a parameter process that performs a process that sets at least one of an attack parameter, a defense parameter, and a movement control parameter of the moving object based on at least one of density information about an assemblage of particles within a line or a range that extends from the moving object in a given direction, and the density information about the assemblage of particles at a position of the moving object; and an image generation process that generates an image viewed from a given viewpoint in the object space.

According to another aspect of the invention, there is provided an image generation method comprising: an object space setting process that performs a process that places a plurality of objects including a moving object in an object space; a moving object calculation process that performs a movement process that moves the moving object in the object space; a parameter process that performs a process that sets at least one of an attack parameter, a defense parameter, and a movement control parameter of the moving object based on at least one of density information about an assemblage of particles within a line or a range that extends from the moving object in a given direction, and the density information about the assemblage of particles at a position of the moving object; and an image generation process that generates an image viewed from a given viewpoint in the object space.

According to another aspect of the invention, there is provided a computer-readable information storage medium storing a program that causes a computer to execute one of the above image generation methods.

BRIEF DESCRIPTION OF THE DRAWINGS

FIG. 5 is a view illustrating a method according to one embodiment of the invention that utilizes the cloud density within a line.

FIGS. 13A to 13C are views illustrating an action probability table.

DESCRIPTION OF EXEMPLARY EMBODIMENTS

Figure 1:
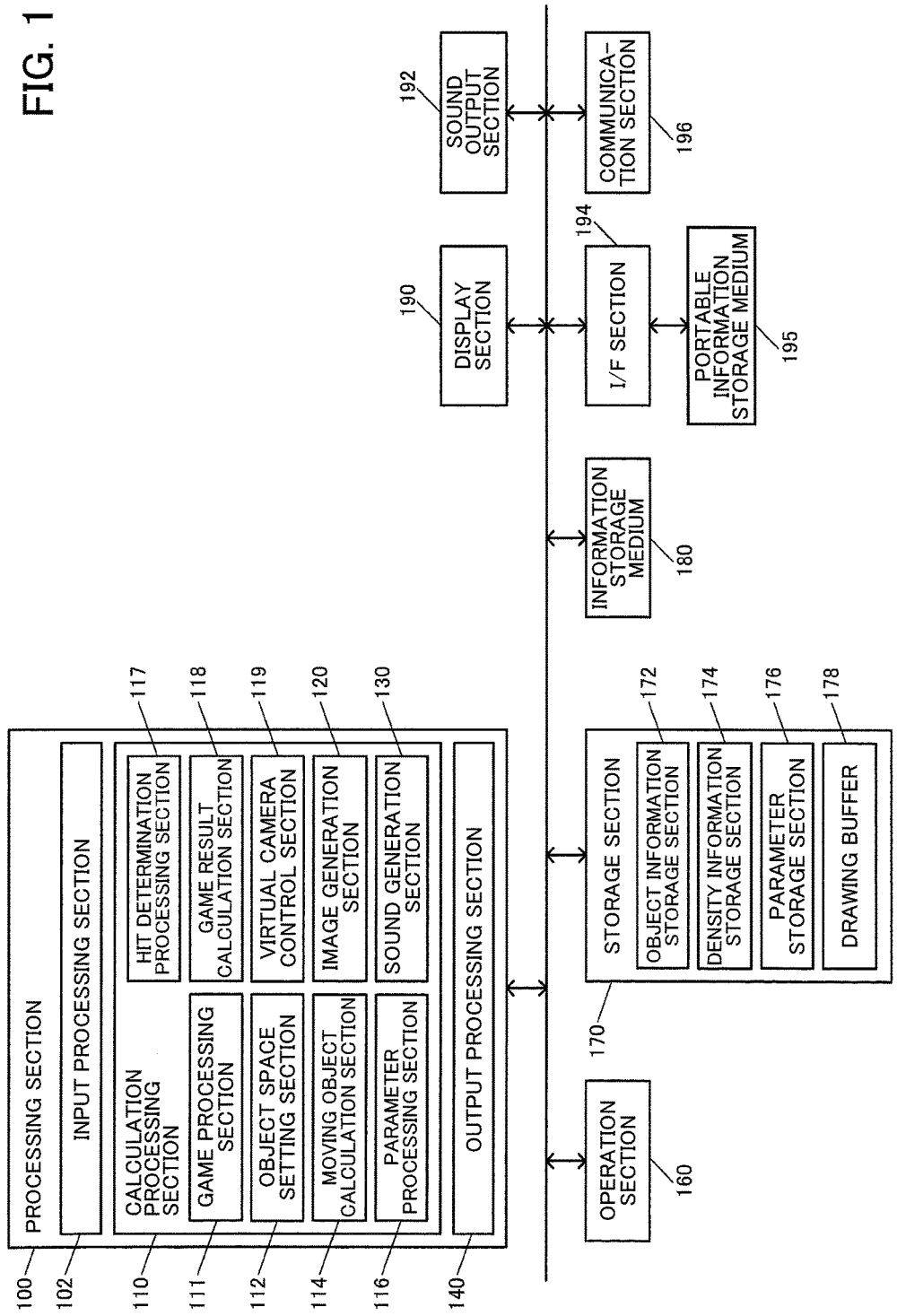
FIG. 1 illustrates a configuration example of an information generation system according to one embodiment of the invention.
Figure 2A:
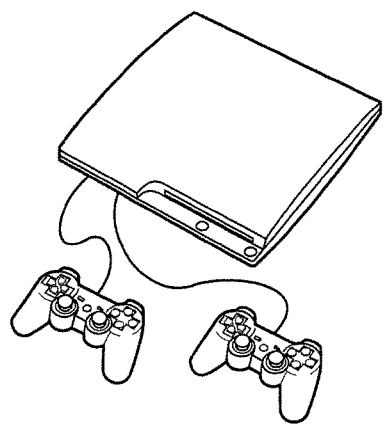
FIGS. 2A to 2F are views illustrating a hardware configuration example of an image generation system according to one embodiment of the invention.
Figure 2B:
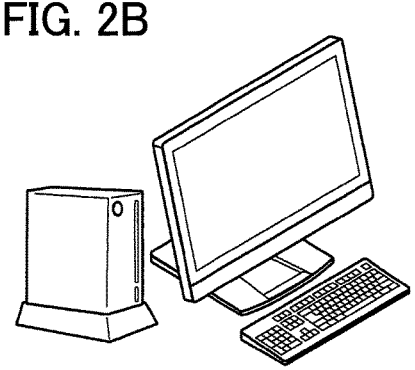
Figure 2C:
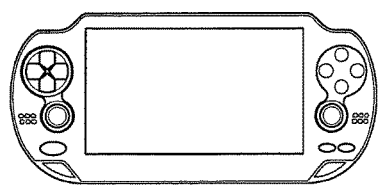
Figure 2D:
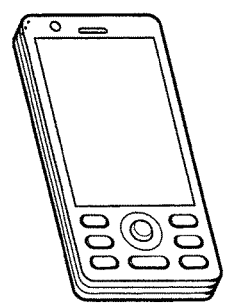
Figure 2E:
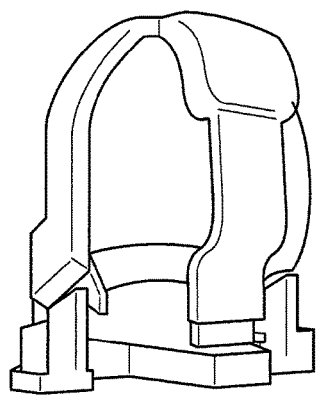
Figure 2F:
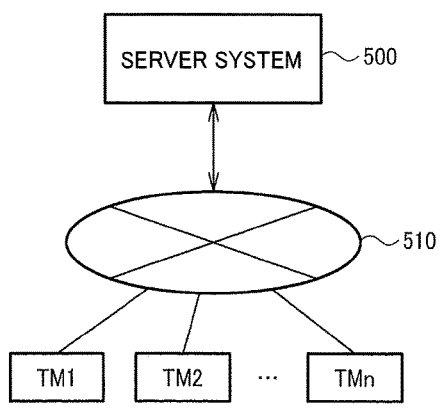

Several aspects of the invention may provide an image generation system, an image generation method, an information storage medium, and the like that make it possible to implement a situation in which the attack capability, the defense capability, the moving capability, or the like of a moving object is affected by the presence of an assemblage of particles.

According to one embodiment of the invention, there is provided an image generation system comprising: a processor comprising hardware, the processor being configured to implement: an object space setting process that performs a process that places a plurality of objects including a moving object in an object space; a moving object calculation process that performs a movement process that moves the moving object in the object space; a parameter process that performs a process that sets at least one of an attack parameter, a defense parameter, and a movement control parameter of the moving object based on at least one of density information about an assemblage of particles within a line or a range that extends from the moving object in a given direction, and the density information about the assemblage of particles at a position of the moving object; and an image generation process that generates an image viewed from a given viewpoint in the object space.

According to one embodiment of the invention, the moving object is moved in the object space in which a plurality of objects are placed, and an image viewed from a given viewpoint in the object space is generated. According to one embodiment of the invention, the attack parameter, the defense parameter, or the movement control parameter of the moving object is set based on the density information about the assemblage of particles within a line or a range that extends from the moving object in a given direction, or the density information about an assemblage of particles at the position of the moving object. Therefore, it is possible to implement a situation in which the attack capability, the defense capability, the moving capability, and the like of the moving object are affected by the presence of an assemblage of particles, and implement a novel image generation system.

In the image generation system, the processor may implement the parameter process that performs a process that sets the attack parameter of the moving object based on the density information within a line that connects the moving object and an attack target of the moving object.

According to this configuration, it is possible to implement the process that sets the attack parameter of the moving object using the density information within a line that connects the moving object and the attack target as the density information about an assemblage of particles present between the moving object and the attack target.

In the image generation system, the attack parameter may be at least one parameter among tracking performance of an attacking object that is launched from the moving object, lock-on performance of the attacking object, and moving performance of the attacking object.

According to this configuration, it is possible to implement a situation in which the tracking performance, the lock-on performance, or the moving performance of the attacking object that is launched from the moving body is affected by the presence of an assemblage of particles to control the attacking object.

In the image generation system, the processor may implement the parameter process that performs a process that sets the movement control parameter of the moving object based on the density information at the position of the moving object.

According to this configuration, it is possible to implement a situation in which the movement control parameter of the moving object is affected by the density information about an assemblage of particles at the position of the moving object to control the movement of the moving object.

In the image generation system, the processor may implement the moving object calculation process that performs a process that moves a computer-operated moving object as the moving object, the computer-operated moving object moving in the object space based on an operation performed by a computer, and the parameter processing section may perform a process that sets the movement control parameter of the computer-operated moving object based on the density information within first to Nth lines that respectively extend from the computer-operated moving object in first to Nth directions.

According to this configuration, it is possible to control the movement of the computer-operated moving object using the density information about an assemblage of particles within the first to Nth lines that respectively extend from the computer-operated moving object in the first to Nth directions. Specifically, since it is possible to detect whether or not an assemblage of particles is present in the first to Nth directions, and control the movement of the computer-operated moving object, it is possible to implement a novel process that controls the movement of a computer-operated moving object.

In the image generation system, the processor may implement the parameter process that performs a process that sets the movement control parameter so that the computer-operated moving object moves in a direction that avoids a direction that corresponds to a line among the first to Nth lines for which it has been determined that density represented by the density information is high.

According to this configuration, it is possible to move the computer-operated moving object in a direction that avoids the direction that corresponds to the line for which it has been determined that the density represented by the density information is high. Therefore, it is possible to implement a process that controls the movement of a computer-operated moving object so that the computer-operated moving object moves so as to avoid an assemblage of particles, for example.

In the image generation system, the processor may implement the parameter process that performs a process that sets the movement control parameter so that the computer-operated moving object moves in the direction that corresponds to the line for which it has been determined that the density represented by the density information is high, when it has been determined that status of the computer-operated moving object is in a given state.

According to this configuration, it is possible to move the computer-operated moving object in the direction that corresponds to the line for which it has been determined that the density represented by the density information is high, when the status of the computer-operated moving object is in a given state. Therefore, it is possible to implement a process that controls the movement of a computer-operated moving object so that the computer-operated moving object moves toward an assemblage of particles when the status of the computer-operated moving object is in a given state.

In the image generation system, the processor may implement the moving object calculation process that performs a process that moves a player's moving object as the moving object, the player's moving object moving in the object space based on operation information input by a player, and the processor may implement the image generation process that performs a display process that changes a display pattern of an attack support display object corresponding to the density information, the attack support display object being displayed to the player when the player's moving object attacks an attack target.

According to this configuration, it is possible to change the display pattern of the attack support display object (that is displayed to the player when the player's moving object attacks the attack target) corresponding to the density information about the assemblage of particles. Specifically, it is possible to visually notify the player of the effect of the density information about the assemblage of particles by utilizing a change in the display pattern of the attack support display object.

In the image generation system, the processor may implement the image generation process that performs a process that generates an image of the assemblage of particles based on the density information.

According to this configuration, it is possible to set the attack capability parameter, the defense capability parameter, or the movement control parameter of the moving object by effectively utilizing the density information that is used to generate an image of the assemblage of particles.

In the image generation system, the processor may implement the image generation process that performs the process that generates the image of the assemblage of particles by a volume rendering process that uses a voxel value, and the processor may implement the parameter process that acquires the voxel value used for the volume rendering process as the density information about the assemblage of particles.

According to this configuration, it is possible to set the attack capability parameter, the defense capability parameter, or the movement control parameter of the moving object by effectively utilizing the voxel value used for the volume rendering process that is used to generate an image of the assemblage of particles.

In the image generation system, the processor may implement the parameter process that sets a degree of change in the attack parameter or the defense parameter based on the density information based on at least one of a type of the moving object, a moving state of the moving object, a status parameter of a player who operates the moving object, and charge information about the player.

According to this configuration, it is possible to cause the degree of change in the attack parameter or the defense parameter based on the density information corresponding to the type of moving object, the moving state of the moving object, the status parameter of the player, or the charge information about the player, and implement various game processes.

The exemplary embodiments of the invention are described below. Note that the following exemplary embodiments do not in any way limit the scope of the invention laid out in the claims. Note also that all of the elements described below in connection with the exemplary embodiments should not necessarily be taken as essential elements of the invention.

1. Image Generation System

FIG. 1 illustrates a configuration example of an image generation system (image generation device, game system, or game device) according to one embodiment of the invention. The image generation system includes a processing section 100, an operation section 160, a storage section 170, a display section 190, a sound output section 192, an I/F section 194, and a communication section 196. Note that the configuration of the image generation system according to one embodiment of the invention is not limited to the configuration illustrated in FIG. 1. Various modifications may be made, such as omitting some of the elements (sections) illustrated in FIG. 1, or providing an additional element.

The processing section 100 performs various processes (e.g., input process, calculation process, and output process) based on operation information output from the operation section 160, a program, and the like. The processing section 100 (processor) performs each process according to one embodiment of the invention based on information (program and data) stored in the storage section 170 (memory). For example, the processing section 100 performs each process according to one embodiment of the invention using the storage section 170 as a work area.

Each process (each function) according to one embodiment of the invention that is performed (implemented) by each section of the processing section 100 may be implemented by a processor (i.e., a processor including hardware). For example, each process according to one embodiment of the invention may be implemented by a processor that operates based on information (e.g., program), and a memory that stores information (e.g., program). The function of each section of the processor may be implemented by individual hardware, or may be implemented by integrated hardware, for example. For example, the processor may include hardware, and the hardware may include at least one of a circuit that processes a digital signal and a circuit that processes an analog signal. For example, the processor may include (may be implemented by) one or a plurality of circuit devices (e.g., IC) or one or a plurality of circuit elements (e.g., resistor or capacitor) that are mounted on a circuit board. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an ASIC. The processor may include an amplifier circuit, a filter circuit, and the like that process an analog signal. The memory (storage section 170) may be a semiconductor memory (e.g., SRAM or DRAM), or may be a register. The memory may be a magnetic storage device such as a hard disk drive (HDD), or may be an optical storage device such as an optical disk device. For example, the memory stores a computer-readable instruction, and the process (function) of each section of the processing section 100 is implemented by causing the processor to execute the instruction. The instruction may be an instruction set that is included in a program, or may be an instruction that instructs the hardware circuit included in the processor to operate.

The processing section 100 includes an input processing section 102, a calculation processing section 110, and an output processing section 140. The input processing section 102 performs an input process (information input process). For example, the input processing section 102 performs a process (i.e., input process) that receives operation information that has been input by the player using the operation section 160. For example, the input processing section 102 performs a process that acquires the operation information detected by the operation section 160. The input processing section 102 performs a process (i.e., input process) that reads information from the storage section 170. For example, the input processing section 102 performs a process that reads information designated by a readout command from the storage section 170. The input processing section 102 performs a process (reception process) (i.e., input process) that receives information through the communication section 196. For example, the input processing section 102 performs a process that receives information from an external device (e.g., another image generation system or server system) that is provided outside the image generation system through a network. The reception process includes a process that instructs the communication section 196 to receive information, a process that acquires information received by the communication section 196, and writes the acquired information into the storage section 170, and the like.

The calculation processing section 110 performs various calculation processes. For example, the calculation processing section 110 performs a game process, an object space setting process, a moving object calculation process, a parameter process, a hit determination process, a game result calculation process, a virtual camera control process, an image generation process, a sound generation process, and the like. The calculation processing section 110 includes a game processing section 111, an object space setting section 112, a moving object calculation section 114, a parameter processing section 116, a hit determination processing section 117, a game result calculation section 118, a virtual camera control section 119, an image generation section 120, and a sound generation section 130.

The game process includes a process that starts the game when a game start condition has been satisfied, a process that proceeds with the game, a process that terminates the game when a game termination condition has been satisfied, and the like. The game process is performed by the game processing section 111 (program module that implements the game process).

The object space setting process is a process that places a plurality of objects in an object space. The object space setting process is performed by the object space setting section 112 (program module that implements the object space setting process). For example, the object space setting section 112 places an object (i.e., an object that is formed by a primitive surface such as a polygon, a free-form surface, or a subdivision surface) that represents a display object such as a moving object (e.g., airplane, robot, ship, fighter aircraft, tank, battleship, human, animal, or car), a map (geographical feature), a building, a course (road), a tree, a wall, or a water surface in the object space. Specifically, the object space setting section 112 determines the position and the rotation angle (synonymous with orientation or direction) of the object in a world coordinate system, and places the object at the determined position (X, Y, Z) and the determined rotation angle (rotation angles around X, Y, and Z-axes). More specifically, an object information storage section 172 included in the storage section 170 stores an object number and object information (e.g., information about the position, the rotation angle, the moving speed, and the moving direction of the object (part object)) in a linked manner. The object space setting section 112 performs a process that updates the object information every frame, for example.

The moving object calculation process is a calculation process with respect to the moving object. For example, the moving object calculation process includes a process that moves the moving object (i.e., a display object that appears in the game) in the object space (virtual three-dimensional space or three-dimensional game space), and a process that causes the moving object to make a motion. The moving object calculation process is performed by the moving object calculation section 114 (program module that implements the moving object calculation process). For example, the moving object calculation section 114 performs a control process that causes the moving object (model object) to move or make a motion (animation) in the object space based on the operation information that has been input by the player using the operation section 160, a program (movement-motion algorithm), various types of data (motion data), and the like. More specifically, the moving object calculation section 114 performs a simulation process that sequentially calculates movement information (position, rotational angle, speed, or acceleration) and motion information (position or rotational angle of the part object) about the moving object every frame (e.g., every 1/60th of a second). Note that the term "frame" used herein refers to a time unit that is used when performing the moving object movement-motion process (simulation process) and the image generation process.

The parameter process is a process that sets and calculates various parameters used for the game process. The parameter process is performed by the parameter processing section 116 (program module that implements the parameter process). The parameter processing section 116 performs a process that initialize the value of the parameter, a process that increases or decreases the value of the parameter, and the like. The parameter is a variable that is used for the game process. For example, the parameter processing section 116 performs a process that sets and calculates various parameters such as a parameter (e.g., attack parameter, defense parameter, movement control parameter, and status parameter) with respect to the moving object (player's moving object and computer-operated moving object), a parameter with respect to the game process, and a parameter with respect to the state of the game.

The hit determination process is a process that determines whether or not a contact (intersection or collision) between one object and another object has occurred. The hit determination process is performed by the hit determination processing section 117 (program module that implements the hit determination process). The game result calculation process is a process that calculates the game result of the player. For example, the game result calculation process includes a process that calculates the points and the score obtained by the player during the game, and a process that calculates the game result (e.g., in-game money, token, or ticket). The game result calculation process is performed by the game result calculation section 118 (program module that implements the game result calculation process).

The virtual camera control process is a process that controls a virtual camera (viewpoint or reference virtual camera) for generating an image viewed from a given (arbitrary) viewpoint in the object space. The virtual camera control process is performed by the virtual camera control section 119 (program module that implements the virtual camera control process). More specifically, the virtual camera control section 119 performs a process that controls the position (X, Y, Z) or the rotational angle (rotational angles around X, Y, and Z-axes) of the virtual camera (i.e., a process that controls the viewpoint position, the line-of-sight direction, or the angle of view). For example, when the moving object is photographed from behind using the virtual camera, the virtual camera control section 119 controls the position (viewpoint position) and the direction (line-of-sight direction) of the virtual camera so that the virtual camera follows a change in the position or the direction of the moving object. In this case, the virtual camera control section 119 may control the virtual camera based on information (e.g., position, direction, or speed) about the moving object obtained by the moving object calculation section 114. Alternatively, the virtual camera control section 119 may rotate the virtual camera by a predetermined rotation angle, or may move the virtual camera along a predetermined path. In this case, the virtual camera control section 119 controls the virtual camera based on virtual camera data that specifies the position (moving path) or the direction of the virtual camera.

The image generation process is a process that generates an image (game image) that is displayed on the display section 190, and may include an image synthesis process, an image effect process, and the like. The sound generation process is a process that generates a sound (game sound) (e.g., background music (BGM), effect sound, or voice) that is output from the sound output section 192, and may include a sound synthesis process, a sound effect process, and the like. The image generation process and the sound generation process are performed by the image generation section 120 and the sound generation section 130 (program modules that implement the image generation process and the sound generation process).

For example, the image generation section 120 performs a drawing process based on the results of various processes (game process and simulation process) performed by the processing section 100 to generate an image, and outputs the generated image to the display section 190. More specifically, the image generation section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or α-value) based on the results of the geometric process. The image generation section 120 draws the object (one or a plurality of primitive surfaces) subjected to perspective transformation (geometric process) in a drawing buffer 178 (i.e., a buffer (e.g., frame buffer or work buffer) that can store image information on a pixel basis) based on the drawing data (primitive surface data). The image generation section 120 thus generates an image viewed from a given viewpoint (virtual camera) in the object space.

The drawing process performed by the image generation section 120 may be implemented by a vertex shader process, a pixel shader process, and the like. For example, the image generation section 120 performs a vertex process that performs a geometric process (e.g., vertex moving process, coordinate transformation (world coordinate transformation or camera coordinate transformation) process, clipping process, or perspective transformation process) based on a vertex processing program (vertex shader program), and changes (updates or adjusts) the vertex data about each vertex that forms the object based on the processing results. The image generation section 120 performs a rasterization process (scan conversion process) based on the vertex data obtained by the vertex process so that the surface of the polygon (primitive) is linked to pixels. The image generation section 120 performs a pixel process that determines the final drawing color of each pixel that forms the image by performing various processes such as a texture readout process (texture mapping process), a color data setting/ change process, a translucent blending process, and an anti-aliasing process based on a pixel processing program (pixel shader program), and outputs (draws) the drawing color of the object that has been subjected to the perspective transformation process to (in) the drawing buffer 178. Specifically, the pixel process includes a per-pixel process that sets or changes image information (e.g., color, normal, luminance, and α-value) on a pixel basis. The image generation section 120 thus generates an image viewed from a given viewpoint (virtual camera) in the object space.

Note that the vertex process and the pixel process may be implemented by hardware that enables a programmable polygon (primitive) drawing process (i.e., a programmable shader (vertex shader and pixel shader)) based on a shader program written in shading language. Since the programmable shader enables a programmable per-vertex process and a programmable per-pixel process, and increases the degree of freedom with respect to the drawing process, the representation capability can be significantly improved as compared with a fixed drawing process using hardware.

The output processing section 140 performs an output process that outputs various types of information. For example, the output processing section 140 performs a process (i.e., output process) that writes information into the storage section 170. For example, the output processing section 140 performs a process that writes information designated by a write command into the storage section 170. The output processing section 140 performs a process (i.e., output process) that outputs information about the generated image to the display section 190, and a process (output process) that outputs information about the generated sound to the sound output section 192. The output processing section 140 performs a process (output process) that transmits information through the communication section 196. For example, the output processing section 140 performs a process that transmits information to an external device (e.g., another image generation system or server system) that is provided outside the game device through a network. The transmission process includes a process that instructs the communication section 196 to transmit information, a process that instructs the communication section 196 with regard to the transmission target information, and the like.

The operation section 160 (operation device) allows the player (user) to input the operation information. The function of the operation section 160 may be implemented by a direction key, an operation button, an analog stick, a lever, a sensor (e.g., angular speed sensor or acceleration sensor), a microphone, a touch panel display, or the like.

The storage section 170 (memory) serves as a work area for the processing section 100, the communication section 196, and the like. The function of the storage section 170 may be implemented by a RAM, an SSD, an HDD, or the like. A game program, and game data that is necessary when executing the game program are stored in the storage section 170. The storage section 170 includes an object information storage section 172, a density information storage section 174, a parameter storage section 176, and a drawing buffer 178.

An information storage medium 180 (computer-readable medium) stores a program, data, and the like. The function of the information storage medium 180 may be implemented by an optical disk (DVD or CD), a hard disk drive (HDD), a memory (e.g., ROM), or the like. The processing section 100 performs various processes according to one embodiment of the invention based on a program (data) stored in the information storage medium 180. A program that causes a computer (i.e., a device that includes an operation section, a processing section, a storage section, and an output section) to function as each section according to one embodiment of the invention (i.e., a program that causes a computer to execute the process of each section) may be stored in the information storage medium 180.

The display section 190 outputs (displays) an image generated according to one embodiment of the invention. The function of the display section 190 may be implemented by an LCD, an organic EL display, a CRT, an HMD, or the like. The sound output section 192 outputs a sound generated according to one embodiment of the invention. The function of the sound output section 192 may be implemented by a speaker, a headphone, or the like.

The I/F (interface) section 194 performs an interface process that interfaces with a portable information storage medium 195. The I/F section 194 may be implemented by an I/F processing ASIC or the like. The portable information storage medium 195 allows the user to store various types of information. The portable information storage medium 195 is a storage device that holds the information even when the supply of power has been stopped. The portable information storage medium 195 may be implemented by an IC card (memory card), a USB memory, a magnetic card, or the like.

The communication section 196 communicates with an external device (e.g., another image generation system or server system) through a network. The function of the communication section 196 may be implemented by hardware (e.g., communication ASIC or communication processor), or communication firmware.

A program (data) that causes a computer to function as each section according to one embodiment of the invention may be distributed to the information storage medium 180 (or the storage section 170) from an information storage medium included in a server system (host device) through a network and the communication section 196. Use of the information storage medium included in the server system is also intended to be included within the scope of the invention.

FIGS. 2A to 2F are views illustrating a hardware configuration example of the image generation system according to one embodiment of the invention. The image generation system according to one embodiment of the invention may be implemented by various hardware devices such as a consumer game device (stationary game device) (see FIG. 2A), a personal computer (information processing device) (see FIG. 2B), a portable game device (see FIG. 2C), a portable communication terminal (smartphone or mobile phone) (see FIG. 2D), and an arcade game device (see FIG. 2E). For example, each process according to one embodiment of the invention can be implemented by installing (storing) a program according to one embodiment of the invention in a memory that is included in the hardware device (see above), and causing a processor that is included in the hardware device to execute the installed (stored) program. Alternatively, each process according to one embodiment of the invention may be implemented by utilizing a server system 500 illustrated in FIG. 2F. For example, terminal devices TM1 to TMn (i.e., hardware devices illustrated in FIGS. 2A to 2E) are communicably connected to the server system 500 through a network 510. The server system 500 may be implemented by one or a plurality of servers (e.g., management server, game server, charge server, service providing server, content distribution server, authentication server, database server, and communication server), for example. The server system 500 can provide various services for operating a community-type website and an online game, manage the data necessary for implementing (executing) the game, and distribute a client program, various types of data, and the like. The terminal device (TM1 to TMn) accesses the server system 500, and allows the user to play the online game provided by the server system 500. The game implemented by one embodiment of the invention may be such an online game. In this case, the image generation system according to one embodiment of the invention may be implemented by the server system 500, or may be implemented by distributed processing that is implemented by the terminal device (TM1 to TMn) and the server system 500.

As illustrated in FIG. 1, the image generation system (image generation device, game device, or game system) according to one embodiment of the invention includes the object space setting section 112, the moving object calculation section 114, the parameter processing section 116, and the image generation section 120. The object space setting section 112 performs a process that places a plurality of objects including a moving object in the object space. For example, the object space setting section 112 performs a process that determines the placement position of the object in the object space (i.e., virtual three-dimensional space), and places the object that is represented by the object information stored in the object information storage section 172 at the determined placement position. The moving object calculation section 114 performs a movement process that moves the moving object in the object space. For example, the moving object calculation section 114 performs a process that causes the moving object to move or make a motion in the object space based on the operation information input by the player, a movement processing algorithm, and the like. The image generation section 120 generates an image viewed from a given viewpoint (virtual camera) in the object space in which the moving object moves as described above. For example, the image generation section 120 generates an image viewed from a viewpoint that follows the moving object (e.g., a viewpoint that is set at the position of the moving object, or set at a position behind the moving object).

In one embodiment of the invention, the parameter processing section 116 performs a process that sets (calculates) at least one of an attack parameter, a defense parameter, and a movement control parameter of the moving object based on at least one of density information about an assemblage of particles within a line or a range that extends from the moving object in a given direction, and density information about an assemblage of particles at the position of the moving object. The moving object calculation section 114 performs a process that moves the moving object or an attacking object launched from the moving object, and the hit determination processing section 117 performs the hit determination process on the attacking object launched from the moving object and the attack target using the attack parameter, the defense parameter, or the movement control parameter that has been set (calculated) as described above. The game result calculation section 118 performs a process that calculates the game result of the player based on the attack result and the like. The image generation section 120 generates an image the reflects the attack result and the defense result of the player, and the movement of the moving object and the attacking object.

The line or the range that extends from the moving object in the given direction may be one line or range, or may be a plurality of lines or ranges. The line or the range may be a line or a range that connects the moving object and a given target (e.g., attack target), or may be a plurality of lines or ranges that extend from the moving object in given directions with respect to a reference direction (e.g., forward direction) of the moving object. The assemblage of particles refers to a number of particles that are collectively displayed as an image. The assemblage of particles need not necessarily be formed by an object (e.g., particle). It suffices that an assemblage of particles be observed when an image of the assemblage of particles is displayed. The image of the assemblage of particles may be an image of a cloud, fog, dust, smoke, water vapor, a sandstorm, or the like. The term "assemblage of particles" refers to a display object having an indefinite shape in which a number of particulate objects gather together. For example, a cloud is formed through a process in which water vapor in air condenses to form small ice crystals or water particles, which gather together and are suspended in air so as to have an indefinite shape. In one embodiment of the invention, an image of such a cloud or the like is generated and displayed as the image of the assemblage of particles.

The density information is information that represents the degree or the state of the particle density (concentration) in the assemblage of particles. For example, the density information is information that represents whether the density of the assemblage of particles is high or low in each part of the assemblage of particles. The voxel value of each voxel used for a volume rendering process may be used as the density represented by the density information, for example.

In one embodiment of the invention, the attack parameter, the defense parameter, or the movement control parameter of the moving object is set using the density information about the assemblage of particles within a line or a range that extends from the moving object in the given direction, or the density information about the assemblage of particles at the position of the moving object. For example, the attack parameter, the defense parameter, or the movement control parameter is changed based on the density information.

The density information (i.e., line density information) within a line or a range that extends from the moving object in the given direction is obtained from a plurality of densities at a plurality of points that form the line through a given calculation process, for example. When the volume rendering process is used, for example, the voxel values of a plurality of voxels through which the line passes may be used as the plurality of densities. The maximum value among the plurality of densities, the integrated value of the plurality of densities, the average value of the plurality of densities, a density among the plurality of densities that has exceeded a given threshold value, or the like may be used as the line density information, for example. The line that extends from the moving object in the given direction may be a line that extends from the position of the player's moving object toward the position of the computer-operated moving object, or may be a line that extends from the position of the computer-operated moving object toward the position of the player's moving object. The line that extends from the moving object in the given direction may be a line that extends in one direction or a plurality of directions with respect to the position of the moving object (e.g., player's moving object or computer-operated moving object).

The density that is set to a point that is situated at the position of the moving object, or a point that is nearest to the position of the moving object may be used as the density information at the position of the moving object, for example. Alternatively, the average value of a plurality of densities that are set to a plurality of points situated around the position of the moving object may be used as the density information at the position of the moving object, for example. When the volume rendering process is used, for example, the voxel value of the voxel at which the moving object is situated (i.e., the voxel to which the position of the moving object belongs) may be used as the density information at the position of the moving object. The density information is stored in the density information storage section 174. For example, the density information storage section 174 stores the density information as the voxel value that is linked to each of a plurality of voxels that are set to the object space.

The attack parameter and the defense parameter that are set based on the density information about the assemblage of particles are various parameters that are used for the game process with respect to the attack and the defense performed by the moving object. For example, the attack parameter is a parameter that represents the attack capability (attack performance or power) of the moving object. For example, the attack parameter is a parameter that represents the attack capability (attack performance or power) of the attacking object that is launched from the moving object. The defense parameter is a parameter that represents the defense capability (defense performance or power) of the moving object. For example, the defense parameter is a parameter that represents the capability of the moving object to avoid the attacking object, the durability of the moving object, and the like. The movement control parameter that is set based on the density information about the assemblage of particles includes various parameters that are used for the movement control process that controls the movement of the moving object. For example, the movement control parameter is a parameter that represents the moving capability, the turning performance, and the like of the moving object. For example, the movement control parameter is a parameter that represents the acceleration performance, the turning performance, and the like. Various parameters such as the attack parameter, the defense parameter, and the movement control parameter are stored in the parameter storage section 176.

In one embodiment of the invention, the attack parameter, the defense parameter, or the movement control parameter described above is changed based on the density information about the assemblage of particles. This makes it possible to implement an attack process, a defense process, or a movement control process on the moving object that reflects the density information about the assemblage of particles.

The parameter processing section 116 performs a process that sets the attack parameter of the moving object based on the density information within a line (line segment or range) that connects the moving object and the attack target of the moving object. For example, the moving object calculation section 114 performs a process that moves the player's moving object (i.e., moving object) that moves in the object space based on the operation information input by the player. Specifically, the moving object calculation section 114 performs a process that moves the player's moving object (e.g., player's fighter aircraft) that can be arbitrarily moved by the player based on his/her operation. The parameter processing section 116 performs a process that sets the attack parameter of the player's moving object based on the density information within a line (line segment or range) that connects the player's moving object (moving object) and the attack target of the player's moving object. For example, when it has been determined that the density represented by the density information within a line (line segment or range) that connects the player's moving object and the attack target is high (i.e., when it has been determined that the density represented by the density information within a line (line segment or range) that connects the player's moving object and the attack target is higher than a given threshold value), the parameter processing section 116 sets the attack parameter of the player's moving object so that the attack performance of the player's moving object increases.

The attack target is the computer-operated moving object (e.g., enemy fighter aircraft or NPC) that is operated by a computer, a moving object that is operated by another player, an object (e.g., enemy's position) that is placed on the map of the object space, or the like. In one embodiment of the invention, the parameter processing section 116 performs a process that determines a line (i.e., a line within the object space) that connects the player's moving object (moving object) and the attack target, and changes the attack parameter (attack capability) of the player's moving object based on the line density information, for example.

The attack parameter is at least one parameter among the tracking performance of the attacking object (e.g., missile, torpedo, bullet, or laser beam) that is launched from the moving object, the lock-on performance of the attacking object, and the moving performance of the attacking object, for example. The tracking performance represents the performance of the attacking object to track the attack target. For example, the tracking performance may be defined by the turning performance, the angle of view, and the like of the attacking object. The lock-on performance of the attacking object represents the lock-on distance, the lock-on range, the lock-on speed, and the like of the attacking object. The moving performance of the attacking object represents the moving speed (moving acceleration), the turning speed (turning acceleration), the moving accuracy, and the like of the attacking object.

The parameter processing section 116 may perform a process that sets the defense parameter of the player's moving object based on the density information within a line (line segment or range) that connects the computer-operated moving object and the player's moving object. For example, when it has been determined that the density represented by the density information within a line (line segment or range) that connects the computer-operated moving object and the player's moving object is high (i.e., when it has been determined that the density represented by the density information within a line (line segment or range) that connects the computer-operated moving object and the player's moving object is higher than a given threshold value), the parameter processing section 116 sets the defense parameter of the player's moving object so that the defense performance of the player's moving object increases. For example, the parameter processing section 116 sets the defense parameter of the player's moving object so that the capability to avoid the attacking object that is launched from the computer-operated moving object increases, or the amount of damage when the attacking object has hit the player's moving object decreases.

The parameter processing section 116 performs a process that sets the movement control parameter of the moving object based on the density information at the position of the moving object. For example, the parameter processing section 116 performs a process that sets the movement control parameter of the player's moving object based on the density information at the position of the player's moving object that is operated by the player. For example, the parameter processing section 116 changes the movement control parameter corresponding to the density information at the position of the moving object to implement a movement control process on the moving object that reflects the density information. For example, the parameter processing section 116 performs a process that decreases the moving performance (turning performance) of the moving object when the moving object has been situated at a position at which the density is equal to or higher than a specific density for a time equal to or longer than a specific time. The process that sets the movement control parameter may be performed on the player's moving object that is operated by the player, or may be performed on the computer-operated moving object that is operated by a computer.

The moving object calculation section 114 performs a process that moves the computer-operated moving object (computer-controlled moving object) that moves in the object space based on an operation (control) performed by a computer. The parameter processing section 116 performs a process that sets the movement control parameter of the computer-operated moving object based on the density information within first to Nth lines (line segments or ranges) that extend from the computer-operated moving object in first to Nth directions.

The computer-operated moving object is a moving object that moves (makes a motion) according to a given movement algorithm (motion algorithm). The computer-operated moving object is a non-player character (NPC). For example, the movement algorithm that moves the computer-operated moving object is described in a program, and the movement of the computer-operated moving object is controlled based on the movement algorithm and various game states (situations) (battle states (situations)).

The first to Nth lines that extend from the computer-operated moving object in the first to Nth directions (i.e., lines that define the first to Nth directions) are set. For example, the first line is a line that extends from the computer-operated moving object in the forward direction (reference direction in a broad sense). The second line is a line that extends in the leftward direction (second direction) with respect to the direction (reference direction) in which the first line extends, and the third line is a line that extends in the rightward direction (third direction) with respect to the direction (reference direction) in which the first line extends. Note that the number of first to Nth lines may be 2 or less, or may be 3 or more. In one embodiment of the invention, a process that changes the movement control parameter of the computer-operated moving object and the like are performed based on the density information within the first to Nth lines to control the movement of the computer-operated moving object. The density information within the first to Nth lines is the line density information described above, and is obtained from a plurality of densities at a plurality of points that form each line through a given calculation process, for example. When the volume rendering process is used, for example, the voxel values of a plurality of voxels through which each of the first to Nth lines passes may be used as the plurality of densities.

The parameter processing section 116 performs a process that sets the movement control parameter of the computer-operated moving object so that the computer-operated moving object moves in a direction that avoids the direction that corresponds to a line among the first to Nth lines for which it has been determined that the density represented by the density information is high. In other words, the parameter processing section 116 moves the computer-operated moving object in the direction that corresponds to the line for which it has been determined that the density represented by the density information is low.

For example, when it has been determined that the density represented by the line density information within the first line among the first to Nth lines is highest, the movement control process is performed so that the computer-operated moving object moves in a direction (e.g., leftward direction or rightward direction) that avoids the first direction (e.g., forward direction) that corresponds to the first line (i.e., so that the probability that the computer-operated moving object moves in a direction that avoids the first direction increases). For example, the computer-operated moving object is moved so that the computer-operated moving object advances in a direction that extends away from the first direction. Specifically, the computer-operated moving object is moved in a direction that avoids the direction in which the density of the assemblage of particles is high. When it has been determined that the density represented by the line density information within the second line among the first to Nth lines is highest, the movement control process is performed so that the computer-operated moving object moves in a direction (e.g., rightward direction or forward direction) that avoids the second direction (e.g., leftward direction) that corresponds to the second line. For example, the computer-operated moving object is moved so that the computer-operated moving object advances in a direction that extends away from the second direction.

When it has been determined that the status (status parameter) of the computer-operated moving object is in a given state (e.g., the status parameter has become equal to or smaller than a given parameter value) (e.g., when it has been determined that a strength parameter of the computer-operated moving object has become equal to or smaller than a given parameter value), the parameter processing section 116 performs the process that sets the movement control parameter of the computer-operated moving object so that the computer-operated moving object moves in the direction that corresponds to a line among the first to Nth lines for which it has been determined that the density represented by the density information is high. Specifically, when the state is a normal state, the computer-operated moving object is moved in a direction that avoids the direction in which the density of the assemblage of particles is high. On the other hand, when it has been determined that the status of the computer-operated moving object is in a given state (e.g., the strength, the durability, the hit points, or the like has become equal to or smaller (lower) than a parameter value), the computer-operated moving object is moved in the direction in which the density of the assemblage of particles is high. This makes it possible to implement a situation in which the computer-operated moving object has decreased in strength or the like, and runs into the assemblage of particles.

The image generation section 120 performs a display process that changes a display pattern of an attack support display object corresponding to the density information, the attack support display object being displayed to the player when the player's moving object attacks the attack target. For example, the image generation section 120 changes the display pattern (display state) of the attack support display object corresponding to the density information within a line (line segment or range) that connects the player's moving object and the attack target. For example, the image generation section 120 causes the display pattern of the attack support display object to differ between a case where the density represented by the density information is high and a case where the density represented by the density information is low. For example, when it has been determined that the density is high, the image generation section 120 performs a display process that displays the attack support display object in a blinking state, or changes the color, the brightness, the shape, the texture, or the like of the attack support display object. Note that the attack support display object is a display object that notifies the player of the position, the direction, the state, and the like of the attack target. For example, a display object that moves to follow the attack target may be used as the attack support display object. For example, a container used for a head-up display (HUD) may be used as the attack support display object. The display process that changes the display pattern of the attack support display object corresponding to the density information may be a process that selects a pattern that corresponds to the density information from a plurality of display patterns provided in advance corresponding to the attack support display object.

The image generation section 120 performs a process that generates an image of the assemblage of particles based on the density information. For example, when the density represented by the density information is high, the image generation section 120 generates an image in which the assemblage of particles (e.g., cloud) appears to have high density (e.g., cloud density) (i.e., an image in which the particles gather densely (are spaced closely)). On the other hand, when the density represented by the density information is low, the image generation section 120 generates an image in which the assemblage of particles appears to have low density (i.e., an image in which the particles are present sparsely).

For example, the image generation section 120 performs the process that generates an image of the assemblage of particles through the volume rendering process that utilizes the voxel value. The parameter processing section 116 acquires the voxel value used for the volume rendering process as the density information about the assemblage of particles. When the process that generates an image of the assemblage of particles is implemented by the volume rendering process, a plurality of voxels are set in the object space in a grid-like pattern, and the density information about the assemblage of particles is set to be the voxel value of each voxel. The image generation section 120 generates an image of the assemblage of particles through a known volume rendering process that utilizes the voxel value (i.e., density information). More specifically, the image generation section 120 generates an image of the assemblage of particles by performing the volume rendering process by means of a ray casting process that samples the voxels (volumes) along an arbitrary ray. The parameter processing section 116 acquires the density information within a line or a range that extends from the moving object in the given direction based on the voxel values of the voxels that correspond to the line or the range, and sets the attack parameter, the defense parameter, or the movement control parameter of the moving object. Alternatively, the parameter processing section 116 acquires the density information at the position of the moving object based on the voxel values of the voxels that correspond to the position of the moving object, and sets the attack parameter, the defense parameter, or the movement control parameter of the moving object.

The parameter processing section 116 sets the degree of change in the attack parameter or the defense parameter based on the density information based on at least one of the type of moving object, the moving state of the moving object, the status parameter of the player who operates the moving object, and charge information about the player. For example, when the parameter processing section 116 changes the attack parameter or the defense parameter of the moving object based on the density information about the assemblage of particles, the parameter processing section 116 causes the degree of change (e.g., amount of change or change mode) in the attack parameter or the defense parameter to differ between a case where the moving object belongs to a first type and a case where the moving object belongs to a second type. Alternatively, the parameter processing section 116 causes the degree of change in the attack parameter or the defense parameter to differ between a case where the moving object moves in a first moving state (e.g., first speed or first acceleration) and a case where the moving object moves in a second moving state (e.g., second speed or second acceleration). Alternatively, the parameter processing section 116 causes the degree of change in the attack parameter or the defense parameter to differ between a case where the status parameter (e.g., level, rank, or strength) of the player who operates the moving object corresponds to a first state (first parameter value) and a case where the status parameter of the player who operates the moving object corresponds to a second state (second parameter value). Alternatively, the parameter processing section 116 causes the degree of change in the attack parameter or the defense parameter to differ between a case where the amount charged to (to be paid by) the player is a first amount and a case where the amount charged to the player is a second amount. This makes it possible to implement a process that can change the attack parameter or the defense parameter based on the density information in various ways.

2. Method

The method according to the embodiments of the invention is described in detail below. Although an example in which the embodiments of the invention are applied to an image generation system that implements a fighter aircraft game is mainly described below, the embodiments of the invention are not limited thereto. For example, the embodiments of the invention may be applied to image generation systems that implement various games such as a robot battle game, a battleship game, a role-playing game, an action game, a driving game, and a sport game. In such a case, the moving object is a display object (e.g., robot, ship, human, demon, animal, or car) that appears in the game, and moves in the object space (game space). Although an example in which the assemblage of particles is a cloud is mainly described below, the embodiments of the invention are not limited thereto. The assemblage of particles may be a cloud, fog, dust, smoke, water vapor, a sandstorm, and the like.

2.1 Representation of Clouds

Figure 3:
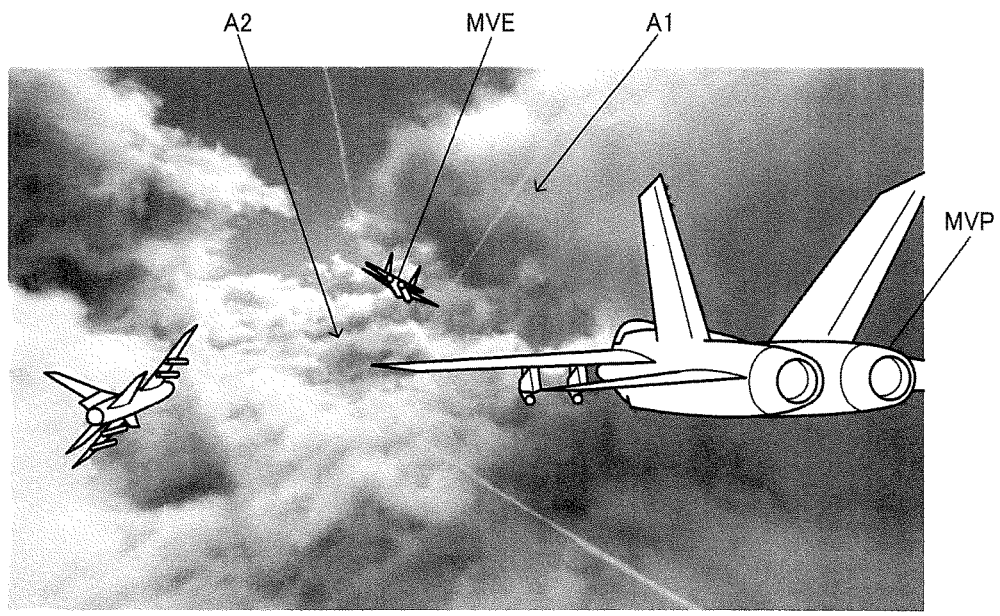
FIG. 3 illustrates an example of a game image generated according to one embodiment of the invention.
Figure 4:
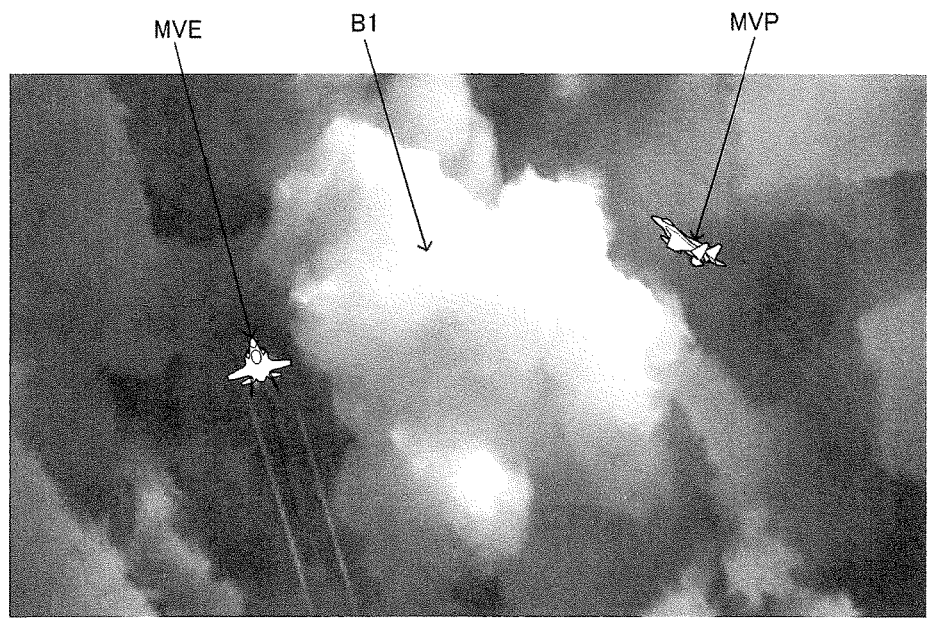
FIG. 4 illustrates an example of a game image generated according to one embodiment of the invention.

FIGS. 3 and 4 illustrate an example of the game image that is generated by the image generation system according to one embodiment of the invention. The fighter aircraft game is a game (flight shooting game) that allows the player to experience exhilaration by making a 360-degree free flight through a realistic three-dimensional space, and enjoy a feeling of accomplishment by overcoming a difficulty while aiming at and shooting down (destroying) enemies one after another based on his/her own judgment.

The game generates a sky image (i.e., game image) in which various clouds (assemblages of particles in a broad sense) that differ in shape and type are formed by volumetric representation so that the player can experience the beauty, the grandeur, and the power of a natural phenomenon. The player can thus experience the beauty, the grandeur, and the power of the natural phenomenon formed by the clouds, and enjoy a 360-degree free flight through the expressive and realistic sky.

For example, FIG. 3 illustrates a game image that represents a scene in which a player's fighter aircraft MVP (player's moving object in a broad sense) that is operated by the player chases (attacks) an enemy fighter aircraft MVE (computer-operated moving object in a broad sense) that flies through clouds (see A1 and A2). As illustrated in FIG. 3, the player can experience an unprecedented sense of speed due to the clouds through which the player's fighter aircraft MVP flies. Specifically, the player's fighter aircraft MVP flies through voluminous clouds that are placed three-dimensionally, and the player can fly the player's fighter aircraft MVP along the desired flight path while visually feeling the moving amount and the moving speed of the player's fighter aircraft MVP.

The game also allows the player to enjoy a variety of dogfights by making full use of the geographical features of the sky. For example, clouds (e.g., cumulonimbus) having icing, lightning, and air turbulence properties are placed in the object space. The player can enjoy a variety of dogfights by making use of the geographical effect of the sky while feeling a varying aerodynamic force in a field (i.e., sky) where an air current visualized by the clouds occurs. The player can experience clouds that block his/her view, an air current that affects the movement of the fighter aircraft, air turbulence, and the like during the game. This makes it possible for the player to feel a sense of battle through a mission.

For example, FIG. 4 illustrates a game image that represents a scene in which the player's fighter aircraft MVP that is operated by the player confronts the enemy fighter aircraft MVE that is operated by a computer (or another player) through the cloud indicated by B1. In this case, the effect of the cloud (the effect of the presence of the cloud) is applied to the attack parameter, the defense parameter, or the movement control parameter of the player's fighter aircraft MVP that attacks the enemy fighter aircraft MVE.

For example, the attack performance of a missile or the like that is launched from the player's fighter aircraft MVP is changed by applying the effect of the cloud indicated by B1 that is present between the player's fighter aircraft MVP and the enemy fighter aircraft MVE. For example, the tracking performance of a missile that has been launched aimed at the enemy fighter aircraft MVE that is situated on the other side of the cloud is decreased. Specifically, the game image is generated so as to represent that the tracking performance of the missile has decreased due to the effect of the cloud, and the probability that the missile will hit the enemy fighter aircraft MVE has decreased. For example, when the missile is an infrared homing missile, the infrared homing function may go wrong due to the reflection of sunlight (e.g., by the surface of a cloud). In one embodiment of the invention, such a decrease in tracking performance or the like is implemented by the game process.

When the player's fighter aircraft MVP has entered a cloud, the moving performance of the player's fighter aircraft MVP is decreased. For example, when the player's fighter aircraft MVP has entered a cloud having a density equal to or higher than a specific density, and stayed within the cloud for a time equal to or longer than a given time, the acceleration performance and the turning performance of the player's fighter aircraft MVP are decreased. For example, when a fighter aircraft has entered a cloud, the pilot suffers deterioration in visibility. When a fighter aircraft has entered a cloud in which air turbulence is present, ice pieces and the like enter the engine of the fighter aircraft, and the moving performance of the fighter aircraft decreases, for example. In one embodiment of the invention, a decrease in moving performance or the like due to entry into a cloud is implemented by the game process.

In one embodiment of the invention, the cloud density (density information about the assemblage of particles in a broad sense) is used to implement such a game process. For example, the attack parameter, the defense parameter, or the movement control parameter of the moving object is set based on the cloud density within a line or a range that extends from the moving object (e.g., player's fighter aircraft MVP or enemy fighter aircraft MVE) in a given direction, or the cloud density at the position of the moving object. For example, the attack parameter, the defense parameter, or the movement control parameter of the moving object is changed based on the cloud density.

For example, the volume rendering process is effective for generating an image of volumetric clouds (see FIGS. 3 and 4). The volume rendering process sets a number of voxels placed in the form of a three-dimensional grid to the object space (three-dimensional space), and sets a voxel value to each voxel. In one embodiment of the invention, the cloud density is set to the voxel value of each voxel in order to generate an image of clouds using the volume rendering process, for example. In this case, a dense cloud is displayed in an area in which a high cloud density is set to the voxels, and a thin cloud is displayed in an area in which a low cloud density is set to the voxels, for example.

For example, a method that generates an image of clouds using a billboard polygon has a problem in that it is difficult to generate an image of volumetric clouds, and finely render the depth of clouds. For example, if a billboard polygon on which clouds are drawn is placed directly in front of the viewpoint of the player, the player may become aware of the presence of the billboard polygon. Therefore, it is difficult to generate a realistic image of volumetric clouds.

On the other hand, it is possible to realistically render the clouds situated directly in front of the viewpoint of the player by generating an image of clouds using the volume rendering process. Specifically, it is possible to implement a game that allows the player to fly through clouds by operating the player's fighter aircraft MVP, and allows the player to experience improved virtual reality.

In one embodiment of the invention, the attack parameter, the defense parameter, or the movement control parameter of the moving object is set by effectively utilizing the cloud density used for the volume rendering process, for example. More specifically, the voxel value of each voxel situated within a line (range) that connects the moving object and the attack target is acquired as the cloud density of the line (range), for example. The attack parameter, the defense parameter, or the movement control parameter of the moving object is changed based on the cloud density of the line (range). Alternatively, the voxel value of each voxel where the moving object is situated is acquired as the cloud density. The attack parameter, the defense parameter, or the movement control parameter of the moving object is changed based on the cloud density at the position of the moving object. This makes it possible to set the attack parameter, the defense parameter, or the movement control parameter of the moving object corresponding to the cloud density by effectively utilizing the voxel value used for the volume rendering process that is used to generate an image of clouds.

A specific method according to one embodiment of the invention is described in detail below.

2.2 Attack Parameter Setting Process that Utilizes Cloud Density

In one embodiment of the invention, the process that sets the attack parameter of the moving object is performed based on the cloud density (i.e., the density information about an assemblage of particles). More specifically, the process that sets the attack parameter of the moving object is performed based on the cloud density within a line that connects the moving object and the attack target.

For example, FIG. 5 illustrates a state in which a cloud CLD (i.e., an assemblage of particles) is present between the player's fighter aircraft MVP and the enemy fighter aircraft MVE (i.e., attack target). The player's fighter aircraft MVP has locked on the enemy fighter aircraft MVE, and the player aims to attack the enemy fighter aircraft MVE by launching a missile or the like. In this case, a line LN that connects the player's fighter aircraft MVP and the enemy fighter aircraft MVE is calculated. For example, the line LN that connects the representative position (position within the object space) of the player's fighter aircraft MVP and the representative position of the enemy fighter aircraft MVE is calculated. The density (cloud density) of the cloud CLD within the line LN is then acquired. In the example illustrated in FIG. 5, the line LN passes through the cloud CLD having high density, and it is determined that the cloud density within the line LN is high. In this case, the attack capability of the player's fighter aircraft MVP that is represented by the attack parameter is decreased. More specifically, the tracking performance, the lock-on performance (e.g., lock-on range and lock-on speed), or the moving performance (e.g., moving speed) of a missile (attacking object in a broad sense) that is launched from the player's fighter aircraft MVP is decreased.

Figure 6A:
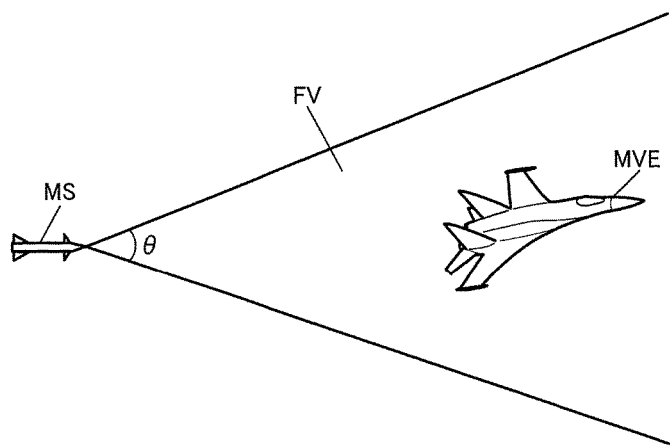
FIGS. 6A to 6C are views illustrating an attack parameter setting process.

As illustrated in FIG. 6A, a homing missile MS has an angle of view θ as a parameter that represents the tracking performance. For example, the field-of-view range FV of the missile MS increases as the angle of view θ increases. The missile MS can track the enemy fighter aircraft MVE situated within the field-of-view range FV. Therefore, the tracking performance of the missile MS increases as the angle of view θ increases.

Figure 6B:
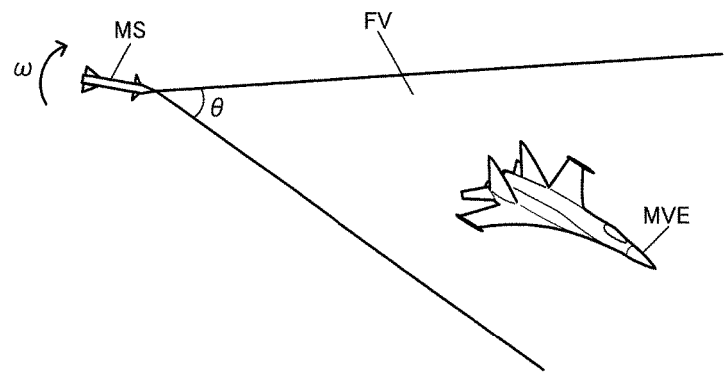
Figure 6C:
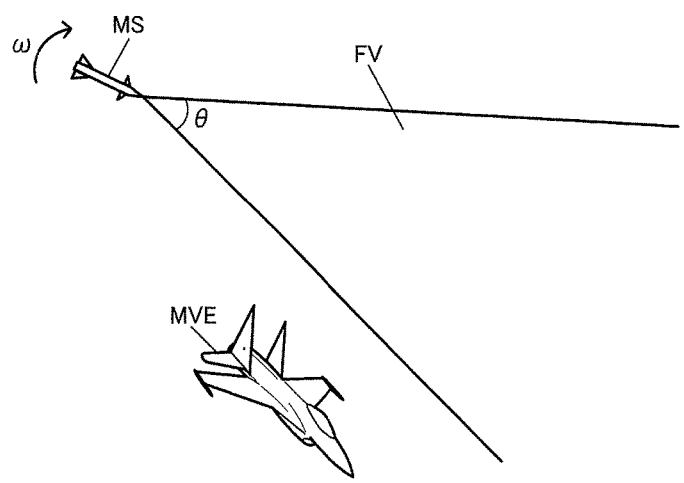

As illustrated in FIG. 6B, when the enemy fighter aircraft MVE has moved (turned) in order to avoid the missile MS, the missile MS turns at an angular velocity co to track the enemy fighter aircraft MVE, for example. The angular velocity w at which the missile MS turns is a parameter that represents the turning performance of the missile MS. The tracking performance of the missile MS increases as the angular velocity ω increases. For example, when the enemy fighter aircraft MVE has left the field-of-view range FV (see FIG. 6C) although the missile MS has turned at the angular velocity co, the missile MS can no longer track the enemy fighter aircraft MVE.

In one embodiment of the invention, the parameters (e.g., angle of view θ and angular velocity ω, of the tracking performance of the missile MS are controlled based on the cloud density within the line illustrated in FIG. 5. For example, when the cloud CLD having high density is present between the player's fighter aircraft MVP and the enemy fighter aircraft MVE, and it has been determined that the cloud density within the line LN is high, the parameters (e.g., angle of view θ and angular velocity ω) of the tracking performance described above with reference to FIGS. 6A to 6C are decreased. When the cloud CLD having high density is not present between the player's fighter aircraft MVP and the enemy fighter aircraft MVE, and it has been determined that the cloud density within the line LN is low, the parameters of the tracking performance are not changed. According to this configuration, an event in which the tracking performance (attack capability in a broad sense) of the missile MS launched from the player's fighter aircraft MVP decreases due to the presence of the cloud CLD can be implemented by the game process.

Note that the attack capability of the missile other than the tracking performance may be changed when the cloud CLD having high density is present between the player's fighter aircraft MVP and the enemy fighter aircraft MVE (see FIG. 5). For example, the lock-on performance (lock-on range and lock-on speed) or the moving performance (e.g., the moving speed of a non-homing missile) of the missile is changed. Alternatively, the attack capability of the attacking object (e.g., laser beam) other than the missile MS may be changed. Alternatively, the attack capability (e.g., radar performance and attacking object detection performance) of the player's fighter aircraft MVP may be changed.

Figure 7A:
FIGS. 7A to 7C are views illustrating a volume rendering process.
Figure 7B:
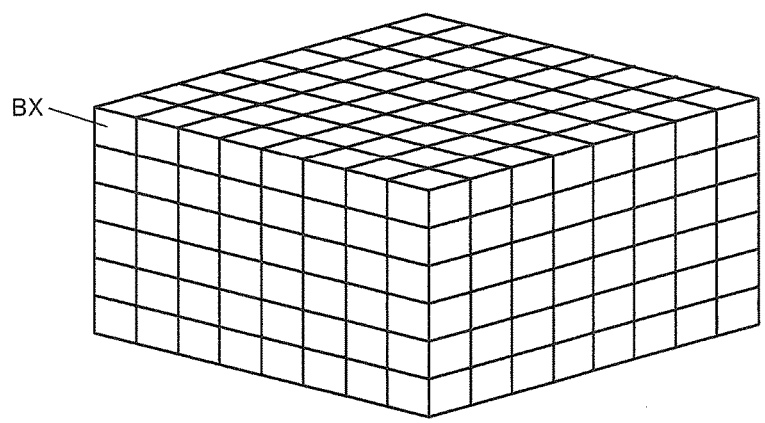
Figure 7C:
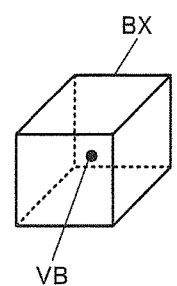

In one embodiment of the invention, the volume rendering process is performed in order to generate a realistic image of the cloud CLD (see FIG. 7A). As illustrated in FIG. 7B, the volume rendering process renders a cloud (i.e., an assemblage of particles) using a volume in which a plurality of voxels BX are placed in the form of a three-dimensional grid. As illustrated in FIG. 7C, a voxel value VB is set to each voxel BX. In one embodiment of the invention, the cloud density (i.e., the density information about an assemblage of particles) at the voxel BX is set to be the voxel value VB. Note that the voxel corresponds to a range from several meters to several tens of meters (or several tens of meters to several hundreds of meters), for example. The height, the width, and the like of the voxel are variable. One cloud (e.g., cumulonimbus) is represented by several tens to several hundreds of voxels.

Figure 8:
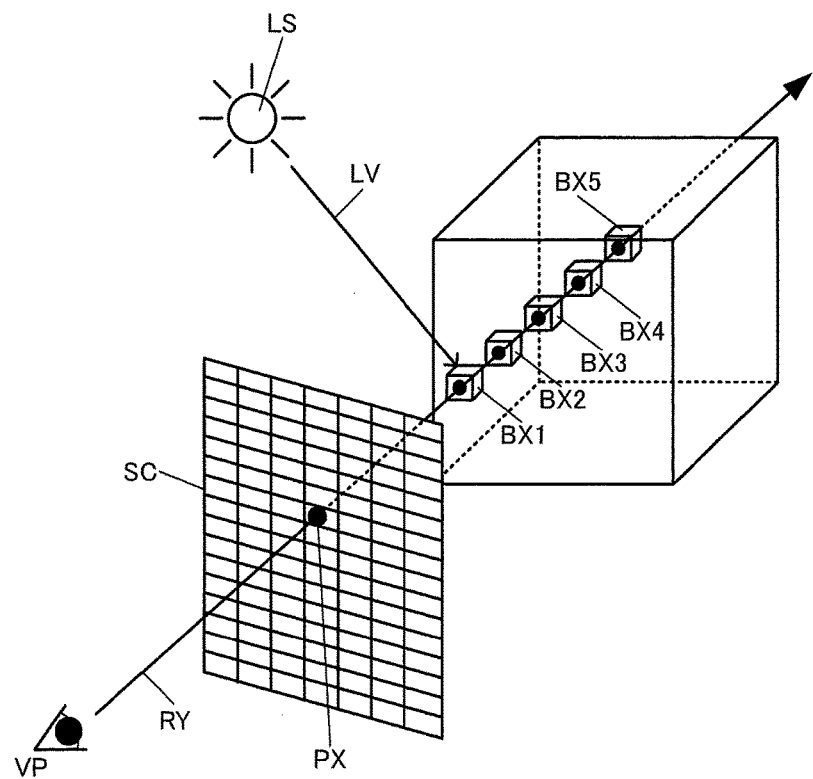
FIG. 8 is a view illustrating a volume rendering process.

FIG. 8 is a view illustrating the details of the volume rendering process. The volume rendering process performs a ray casting process that samples feature quantities (voxel values) set to the object space (virtual three-dimensional space) at given intervals along a ray RY (line of sight), and adds up the feature quantities (voxel values) to generate the final image (translucent (semi-transparent) image). In the example illustrated in FIG. 8, voxels BX1, BX2, BX3, BX4, BX5, . . . within the volume are sampled at given intervals along the ray RY that passes through a viewpoint VP (virtual camera) and a pixel PX within a screen SC (plane of projection). An opacity α is assigned to each voxel. The ray casting process adds up the product of the brightness value and the opacity α of each voxel, and terminates the process on the pixel PX when the sum of the opacities α has reached 1, or when the ray RY has left the volume. The addition result of the ray casting process is set to be the pixel value of the pixel PX. The brightness value and the opacity at the sampling point of the ray casting process can be calculated by linear interpolation based on the brightness values and the opacities of the adjacent voxels.

The brightness value of each voxel can be calculated by an illumination model (e.g., Phong shading model) using a normal vector estimated from the gradient from the voxel values of the adjacent voxels, for example. For example, when generating an image of clouds, the density of water vapor (e.g., voxel value) is a factor that scatters and attenuates light emitted from a light source LS. The brightness of each voxel is represented by the amount of light when light (light source vector LV) that has been emitted from the light source LS and has passed through the volume is reflected and scattered by the voxel and travels in the direction toward the viewpoint VP. A 2-step ray casting process performs a first ray casting process from the light source LS before performing a second ray casting process from the screen SC (plane of projection), and determines the brightness value of each voxel based on the voxel value and light source information. The second ray casting process is performed based on the determined brightness value and the opacity α to calculate the pixel value of each pixel PX. Note that the process described above with reference to FIG. 8 is an example of the volume rendering process, and the volume rendering process used in connection with embodiments of the invention is not limited the process described above with reference to FIG. 8. Various modifications and variations may be made with regard to the volume rendering process.

In one embodiment of the invention, the process that sets the parameter of the player's fighter aircraft MVP is performed using the cloud density within the line LN that connects the player's fighter aircraft MVP (player's moving object) and the enemy fighter aircraft MVE (attack target). The cloud density within the line LN is acquired based on the voxel value to set the attack parameter of the player's fighter aircraft MVP.

Figure 9:
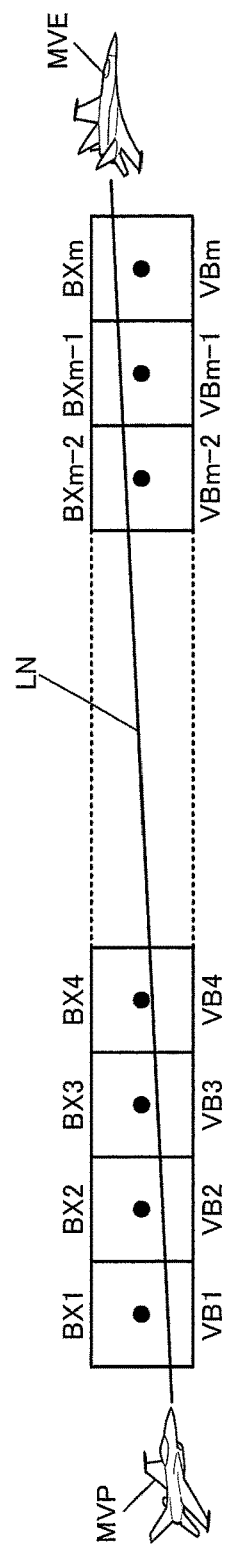
FIG. 9 is a view illustrating a method that acquires the cloud density within a line based on a voxel value.

In the example illustrated in FIG. 9, the line LN that connects the player's fighter aircraft MVP and the enemy fighter aircraft MVE passes through the voxels BX1, BX2, BX3, BX4, . . . , BXm-2, BXm-1, and BXm that are set within the object space. The voxels BX1, BX2, BX3, BX4, . . . , BXm-2, BXm-1, and BXm respectively have voxel values VB1, VB2, VB3, VB4, . . . , VBm-2, VBm-1, and VBm. In this case, the cloud density within the line LN is set using the voxel values VB1 to VBm to set the attack parameter (e.g., the tracking performance of a missile) of the player's fighter aircraft MVP. For example, the cloud density within the line LN is set based on the maximum value, the integrated value, the average value, or the like with respect to the voxel values VB1 to VBm to set the attack parameter.

For example, the range of the voxel value (density) is set to 0 to 1.0 (0 to 100%). For example, when the maximum value among the voxel values VB1 to VBm of the voxels BX1 to BXm (through which the line LN that connects the player's fighter aircraft MVP and the enemy fighter aircraft MVE passes) has exceeded a given threshold value (e.g., 0.7 to 0.8), it is determined that a cloud having high density (concentration) is present between the player's fighter aircraft MVP and the enemy fighter aircraft MVE. In this case, the attack parameter of the player's fighter aircraft MVP is decreased (e.g., the tracking performance of the missile MS launched from the player's fighter aircraft MVP is decreased, or the lock-on performance is decreased) as described above with reference to FIGS. 6A to 6C. Alternatively, the attack parameter of the player's fighter aircraft MVP may be decreased when the integrated value of the voxel values VB1 to VBm has exceeded a given threshold value (e.g., 1.0). For example, the voxel values are sequentially integrated in order from the voxel BX1 situated on the front side (i.e., a side closest to the player's fighter aircraft), and the attack parameter is decreased when the integrated value has exceeded the threshold value. Alternatively, the average value of the voxel values VB1 to VBm that correspond to the line LN may be calculated, and the attack parameter may be decreased when the average value has exceeded a given threshold value.

According to this configuration, it is possible to set the cloud density within the line LN that connects the player's fighter aircraft MVP and the enemy fighter aircraft MVE by effectively utilizing the voxel values of the voxels used for the volume rendering process, and set the attack parameter and the like.

Figure 10:
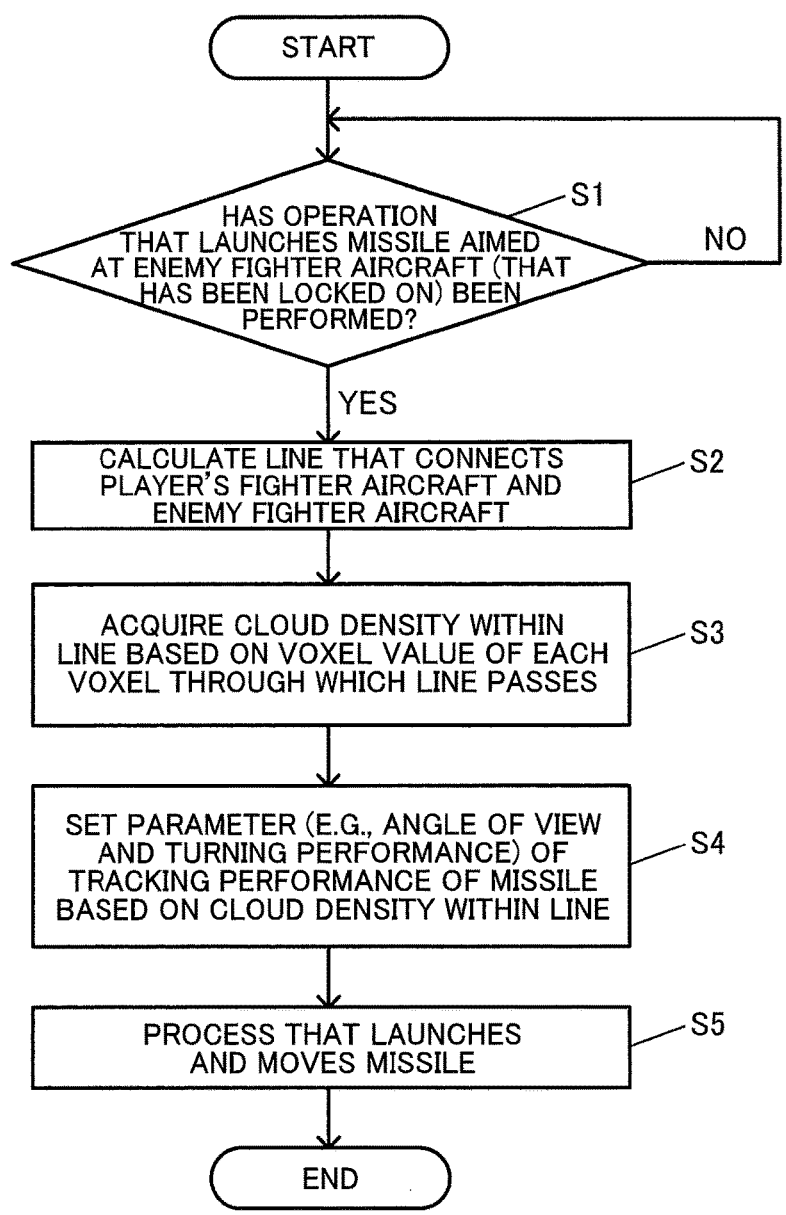
FIG. 10 is a flowchart illustrating an example of a process according to one embodiment of the invention that utilizes the cloud density within a line.

FIG. 10 is a flowchart illustrating an example of the process according to one embodiment of the invention that sets the attack parameter using the cloud density within a line. Whether or not an operation that launches a missile aimed at the enemy fighter aircraft that has been locked has been performed is determined (step S1). Specifically, whether or not the player who operates the player's fighter aircraft has performed a missile launch operation is determined. When it has been determined that the player has performed a missile launch operation, a line (line segment) that connects the player's fighter aircraft and the enemy fighter aircraft is calculated (step S2). The cloud density within the line is acquired based on the voxel value (cloud density) of each voxel through which the line passes (step S3). For example, the representative cloud density within the line is acquired based on the maximum value, the integrated value, the average value, or the like with respect to the voxel values (as described above with reference to FIG. 9).

The parameter (attack parameter) (e.g., angle of view and turning performance) of the tracking performance of the missile is set based on the cloud density within the line (step S4). Specifically, when it has been determined that a cloud having high density is present between the player's fighter aircraft and the enemy fighter aircraft based on the cloud density within the line, the setting process that decreases the angle of view ($\theta$) and the turning performance ($\omega$) of the missile is performed (as described above with reference to FIGS. 6A to 6C). A process that launches and moves the missile (for which the parameter of the tracking performance has been set) is then performed (step S5).

2.3 Movement Control Parameter Setting Process that Utilizes Cloud Density

In one embodiment of the invention, the process that sets the movement control parameter of the moving object is performed based on the cloud density (i.e., the density information about an assemblage of particles). More specifically, the process that sets the movement control parameter of the moving object is performed based on the density information at the position of the moving object.

Figure 11A:
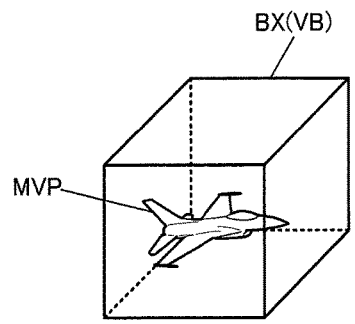
FIGS. 11A and 11B are flowcharts illustrating a method and a processing example according to one embodiment of the invention that utilize the cloud density at the position of a player's fighter aircraft.

In the example illustrated in FIG. 11A, the player's fighter aircraft MVP is situated within the voxel BX. Specifically, the position of the player's fighter aircraft MVP belongs to the voxel BX. In this case, the voxel value VB of the voxel BX is used as the cloud density at the position of the player's fighter aircraft MVP. For example, it is determined that the cloud density around the player's fighter aircraft MVP is low when the voxel value VB is small, and it is determined that the cloud density around the player's fighter aircraft MVP is high when the voxel value VB is large. The movement control parameter (e.g., moving performance (speed, acceleration, angular velocity, and angular acceleration)) of the player's fighter aircraft MVP is set based on the voxel value VB (i.e, cloud density). For example, when it has been determined that the player's fighter aircraft MVP has been situated within a voxel (one voxel or a plurality of voxels) having a large voxel value for a given time, the process that decreases the parameter of the moving performance (turning performance) of the player's fighter aircraft MVP is performed. In this case, the player's fighter aircraft MVP may have passed through a plurality of voxels within the given time. The parameter of the moving performance of the player's fighter aircraft MVP is decreased when the voxel values of all the voxels through which the player's fighter aircraft MVP has passed within the given time are larger than a given threshold value (e.g., 0.7 to 0.8).

Note that the moving object for which the movement control parameter (e.g., moving performance) is set based on the density information at the position of the moving object is not limited to the player's fighter aircraft MVP, but may be the enemy fighter aircraft MVE. The method that calculates the density information at the position of the moving object based on the voxel value is not limited to the method described above with reference to FIG. 11A. For example, the density information at the position of the moving object may be calculated using the voxel value of the voxel within which the moving object is situated, and the voxel values of the voxel situated around (adjacent to) the voxel within which the moving object is situated.

Figure 11B:
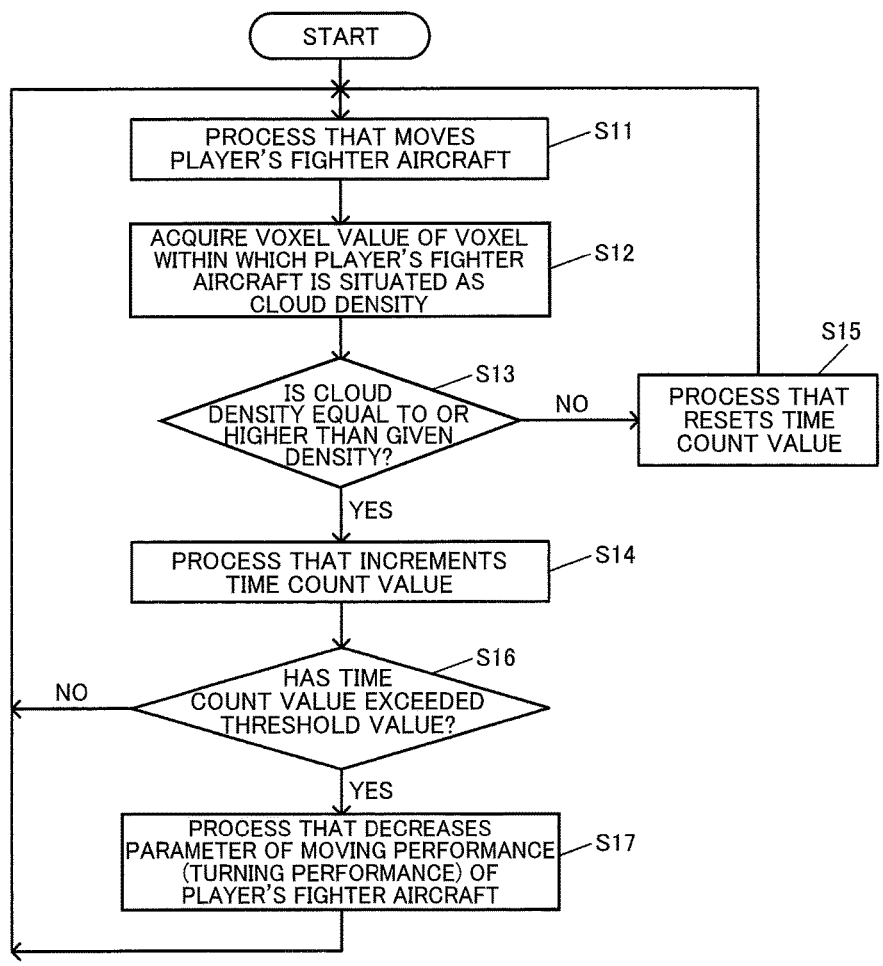

FIG. 11B is a flowchart illustrating an example of the process according to one embodiment of the invention that sets the movement control parameter using the cloud density at the position of the player's fighter aircraft.

A process that moves the player's fighter aircraft is performed (step S11). The voxel value of the voxel within which the player's fighter aircraft is situated is acquired as the cloud density at the position of the player's fighter aircraft (step S12). Specifically, the voxel within which the player's fighter aircraft is situated is searched, and the voxel value of the voxel is acquired to determine the cloud density around the player's fighter aircraft.

Whether or not the acquired cloud density is equal to or higher than a given density is determined (step S13). For example, when the range of the cloud density (voxel value) is set to 0 to 1.0, whether or not the cloud density is equal to or higher than 0.7 determined. When it has been determined that the cloud density is equal to or higher than the given density, a process that increments a time count value is performed (step S14). For example, the time count value is incremented by +1. When it has been determined that the cloud density is lower than the given density, a process that resets the time count value is performed (step S15). For example, the time count value is reset to 0. Specifically, the time count value is reset when the player's fighter aircraft has moved to a place (voxel) where the cloud density is lower than the given density.

After the process that increments the time count value has been performed, whether or not the time count value has exceeded a threshold value is determined (step S16). For example, it is determined that the time count value has exceeded the threshold value when the player's fighter aircraft has been situated in a place (voxel) where the cloud density is equal to or higher than the given density for several seconds or more. A process that decreases the parameter of the moving performance (turning performance) of the player's fighter aircraft is then performed (step S17).

Note that the process illustrated in FIG. 11B may be performed on a moving object (e.g., enemy fighter aircraft) other than the player's fighter aircraft. The process that sets the movement control parameter based on the position of the moving object is not limited to the process that decreases the parameter of the moving performance (turning performance). Various modifications and variations may be made with regard to the process that sets the movement control parameter based on the position of the moving object.

2.4 Process that Controls Movement of Computer-operated Moving Object Using Cloud Density In one embodiment of the invention, the movement of the computer-operated moving object is controlled based on the cloud density (i.e., the density information about an assemblage of particles). For example, the movement of the computer-operated moving object is controlled based on the cloud density within a line (line segment or range) that extends from the computer-operated moving object. More specifically, a process that sets the movement control parameter of the computer-operated moving object is performed based on the cloud densities within first to Nth lines that extend from the computer-operated moving object in first to Nth directions.

Figure 12A:
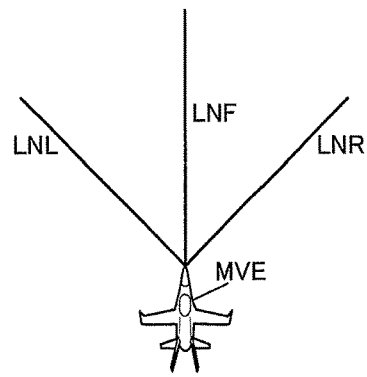
FIG. 12A to 12C are views illustrating a method that controls the movement of an enemy fighter aircraft using cloud density.

In the example illustrated in FIG. 12A, three lines LNF, LNL, and LNR are set to the enemy fighter aircraft MVE (computer-operated moving object). For example, the line LNF (first line) extends from the enemy fighter aircraft MVE in the forward direction (first direction). The line LNL (second line) extends from the enemy fighter aircraft MVE in the leftward direction (second direction). The line LNR (third line) extends from the enemy fighter aircraft MVE in the rightward direction (third direction). Note that these lines are desirably straight lines, but may be curved lines. The computer-operated moving object is not limited to the enemy fighter aircraft. For example, the computer-operated moving object may be a computer-operated moving object (friend fighter aircraft) that fights with the enemy in corporation with the player. The computer-operated moving object may be a computer-operated moving object (member) that belongs to the same group (team) as the player.

In one embodiment of the invention, a cloud that is situated around the enemy fighter aircraft MVE is detected using the lines LNF, LNL, and LNR, and the enemy fighter aircraft MVE (i.e., computer-operated moving object) is moved in a direction in which a cloud is not present. More specifically, the cloud densities within the lines LNF, LNL, and LNR are acquired using the method described above with reference to FIGS. 5 and 9, a direction in which a cloud is present is determined based on the cloud densities, and the enemy fighter aircraft MVE is moved in a direction in which a cloud is not present.

Figure 12B:
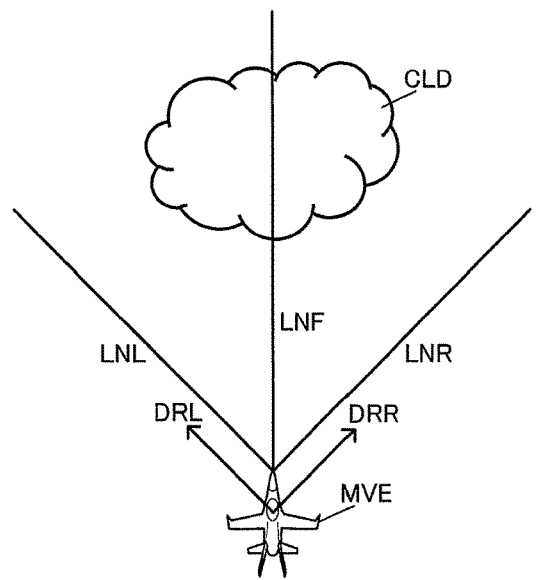

In the example illustrated in FIG. 12B, a cloud CLD is present in the forward direction with respect to the enemy fighter aircraft MVE. In this case, it is determined that the cloud density within the line LNF that extends from the enemy fighter aircraft MVE in the forward direction is high. Specifically, it is determined that the cloud density within the line LNF is higher than the cloud density within the line LNL and the cloud density within the line LNR. In this case, the movement control parameter is set so that the enemy fighter aircraft MVE moves in a direction DRL (leftward direction) or a direction DRR (rightward direction) that is a direction that avoids the direction (forward direction) along the line LNF for which it has been determined that the cloud density is high. This makes it possible to move the enemy fighter aircraft MVE so as to avoid the cloud CLD that is present in the forward direction with respect to the enemy fighter aircraft MVE.

Figure 12C:
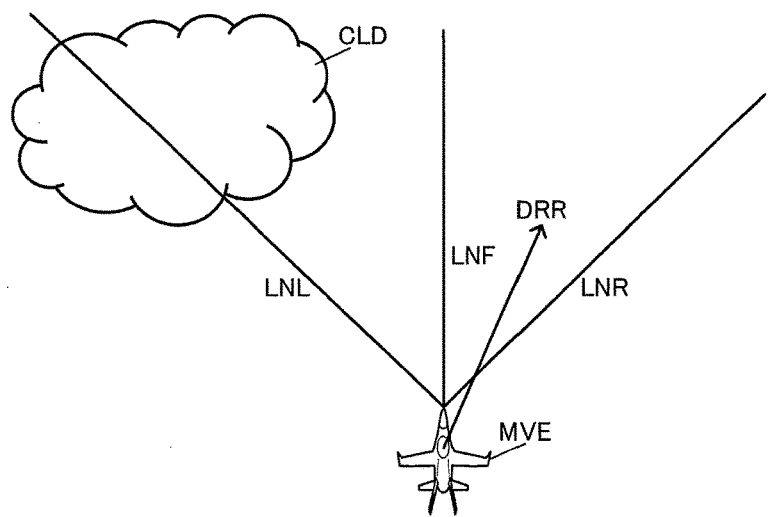

In the example illustrated in FIG. 12C, a cloud CLD is present in the leftward direction (diagonally leftward direction) with respect to the enemy fighter aircraft MVE. In this case, it is determined that the cloud density within the line LNL that extends from the enemy fighter aircraft MVE in the leftward direction is high. Specifically, it is determined that the cloud density within the line LNL is higher than the cloud density within the line LNF and the cloud density within the line LNR. In this case, the movement control parameter is set so that the enemy fighter aircraft MVE moves in the direction DRR that is a direction that avoids the direction (leftward direction) along the line LNL for which it has been determined that the cloud density is high. This makes it possible to move the enemy fighter aircraft MVE so as to avoid the cloud CLD that is present in the leftward direction with respect to the enemy fighter aircraft MVE. When a cloud CLD is present in the rightward direction (diagonally rightward direction) with respect to the enemy fighter aircraft MVE, it is determined that the cloud density within the line LNR that extends from the enemy fighter aircraft MVE in the rightward direction is high, and the enemy fighter aircraft MVE is moved in a direction that avoids the rightward direction.

FIGS. 13A to 13C are views illustrating an example of a movement control parameter setting method that implements the process illustrated in FIGS. 12A to 12C.

In one embodiment of the invention, the action of the enemy fighter aircraft MVE in each action phase is determined using an action probability table illustrated in FIGS. 13A to 13C. For example, various actions (e.g., forward movement, left turn, and right turn) are provided as the action of the enemy fighter aircraft MVE. The action (e.g., forward movement, left turn, or right turn) of the enemy fighter aircraft MVE in each action phase is determined based on the action probability table illustrated in FIGS. 13A to 13C. When the action has been determined, the enemy fighter aircraft MVE makes a motion that corresponds to the determined action for a period that corresponds to several tens of frames, for example. When the action has been completed, the next action is determined based on the action probability table.

FIG. 13A illustrates an example of the action probability table in a normal state. As illustrated in FIG. 13A, the probability that the enemy fighter aircraft MVE will move forward in the normal state is 60%, the probability that the enemy fighter aircraft MVE will make a left turn in the normal state is 20%, and the probability that the enemy fighter aircraft MVE will make a right turn in the normal state is 20%. Specifically, the enemy fighter aircraft MVE moves forward with high probability in the normal state.

When the cloud CLD having high density is present in the forward direction with respect to the enemy fighter aircraft MVE (see FIG. 12B), the action probability table is set as illustrated in FIG. 13B. As illustrated in FIG. 13B, the probability that the enemy fighter aircraft MVE will move forward has been decreased to 10%, the probability that the enemy fighter aircraft MVE will make a left turn has been increased to 45%, and the probability that the enemy fighter aircraft MVE will make a right turn has been increased to 45%. Specifically, the enemy fighter aircraft MVE makes a left turn or a right turn with high probability when the cloud CLD is present in the forward direction with respect to the enemy fighter aircraft MVE.

When the cloud CLD having high density is present in the leftward direction (diagonally leftward direction) with respect to the enemy fighter aircraft MVE (see FIG. 12C), the action probability table is set as illustrated in FIG. 13C. As illustrated in FIG. 13C, the probability that the enemy fighter aircraft MVE will make a left turn has been decreased to 5%, and the probability that the enemy fighter aircraft MVE will make a right turn has been increased to 60%. Specifically, the enemy fighter aircraft MVE makes a right turn with high probability when the cloud CLD is present in the leftward direction with respect to the enemy fighter aircraft MVE.

For example, a pilot who flies a fighter aircraft in the real world normally avoids entering a cloud. This is because deterioration in visibility occurs when the fighter aircraft has entered a cloud, and air turbulence may be present in a cloud. Moreover, ice pieces and the like may enter the engine of the fighter aircraft, and the moving performance of the fighter aircraft may decrease.

The method according to one embodiment of the invention illustrated in FIGS. 12A to 13C makes it possible to simulate the behavior of a pilot who normally avoids entering a cloud. Specifically, it is possible to reproduce a state in which the enemy fighter aircraft flies so as to avoid a cloud as if the enemy fighter aircraft were operated by an actual pilot. In this case, the player runs after the enemy fighter aircraft that flies so as to avoid a cloud by operating the player's fighter aircraft. This makes it possible for the player to enjoy a variety of dogfights by making use of the topographic effect of clouds in air.

It is possible to reduce or suppress a situation in which the enemy fighter aircraft perform uniform behavior by utilizing the method that utilizes the action probability table illustrated in FIGS. 13A to 13C. For example, when a cloud CLD is present in the forward direction with respect to the enemy fighter aircraft (see FIG. 12B), the enemy fighter aircraft basically makes a left turn or a right turn so as to avoid the cloud (see FIG. 13B). However, since the probability that the enemy fighter aircraft will move forward is 10%, a situation in which the enemy fighter aircraft moves toward the cloud instead of avoiding the cloud may also occur. Therefore, it is possible to reduce or suppress a situation in which the enemy fighter aircraft necessarily moves so as to avoid the cloud, and implement a more realistic enemy fighter aircraft movement control process.

Figures 14A, 14B:
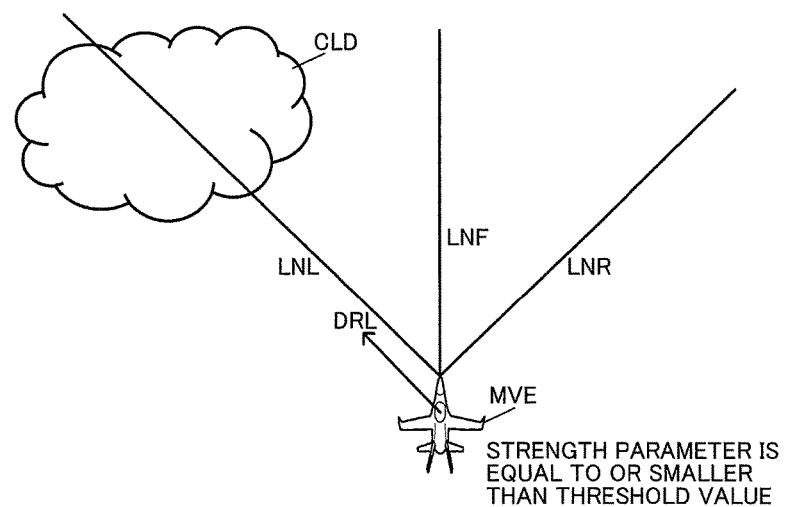
FIGS. 14A and 14B are views illustrating a method that controls the movement of an enemy fighter aircraft using cloud density when a strength parameter has become equal to or smaller than a threshold value.

In the example illustrated in FIG. 14A, the status of the enemy fighter aircraft MVE is in a given state that differs from the state illustrated in FIGS. 12A to 12C. More specifically, the enemy fighter aircraft MVE has been attacked, and the strength parameter has become equal to or smaller than a threshold value, for example. In this case, the enemy fighter aircraft MVE performs an action that differs from the action (behavior) described above with reference to FIGS. 12A to 13C.

In the example illustrated in FIG. 14A, a cloud CLD having high density is present in the leftward direction with respect to the enemy fighter aircraft MVE. In this case, the enemy fighter aircraft MVE moves in a direction that avoids the cloud CLD when the method described above with reference to FIGS. 12A to 13C is used. In the example illustrated in FIG. 14A, however, the strength parameter of the enemy fighter aircraft MVE is very small, and the enemy fighter aircraft MVE is about to be shot down. In this case, the enemy fighter aircraft MVE moves in the direction DRL in which the cloud CLD is present, differing from the example illustrated in FIG. 12C. Specifically, when it has been determined that the status of the enemy fighter aircraft MVE (computer-operated moving object) is in a given state in which the strength parameter is very small, the enemy fighter aircraft MVE moves in the direction along the line LNL for which it has been determined that the cloud density is high. In the example illustrated in FIG. 14A, since it has been determined that the cloud density within the line LNL that extends from the enemy fighter aircraft MVE in the leftward direction is high, the enemy fighter aircraft MVE moves in the direction DRL in which the cloud CLD is present.

This makes it possible to implement (render or display) a situation in which the enemy fighter aircraft runs into a cloud since the strength parameter has decreased. Therefore, it is possible to allow the player who runs after the enemy fighter aircraft to experience and enjoy more realistic and diverse game play.

Figure 15:
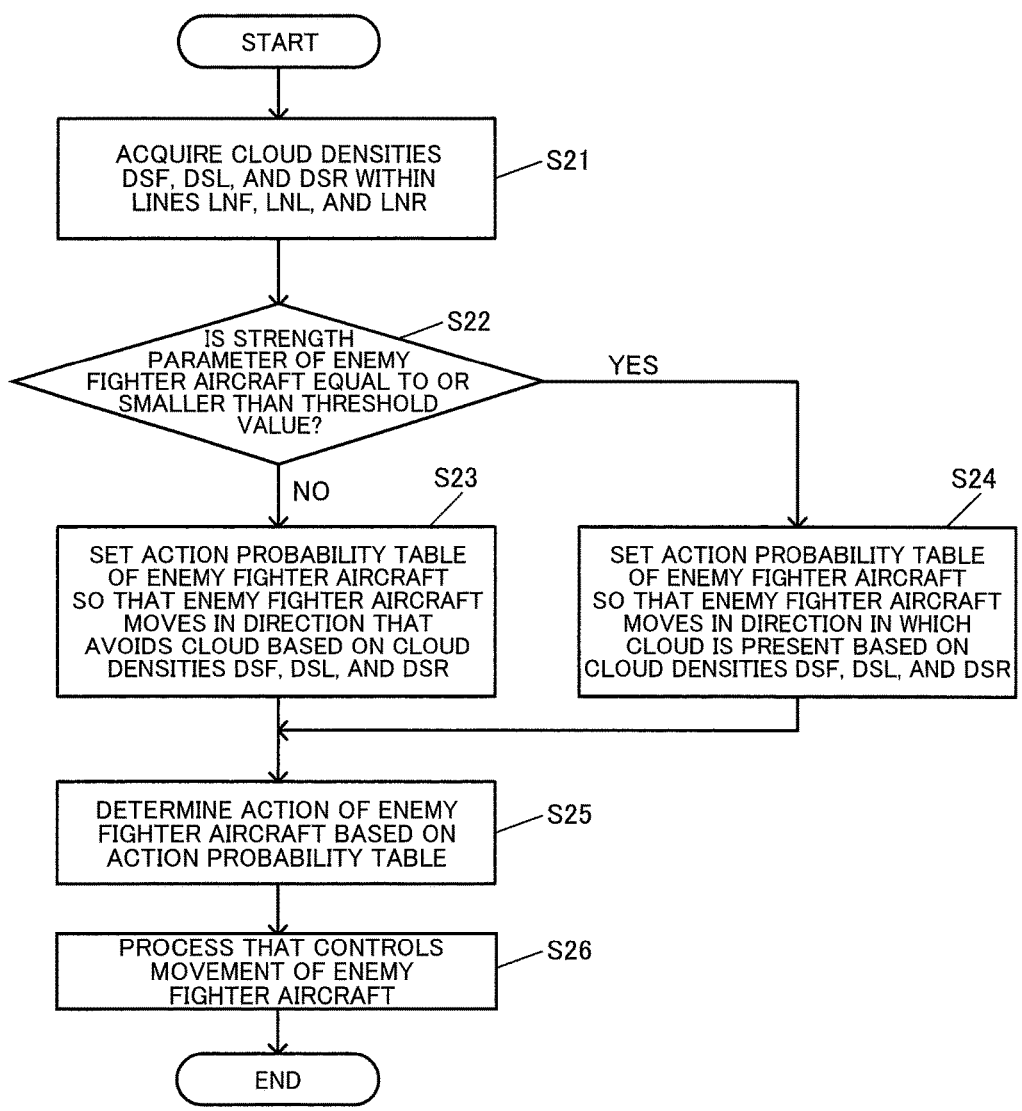
FIG. 15 is a flowchart illustrating a process that controls the movement of an enemy fighter aircraft using cloud density.

FIG. 15 is a flowchart illustrating an example of the process that controls the movement of the enemy fighter aircraft using the cloud density. The cloud densities DSF, DSL, and DSR within the lines LNF, LNL, and LNR are acquired (step S21). For example, the cloud densities DSF, DSL, and DSR within the lines LNF, LNL, and LNR are acquired based on the maximum value, the integrated value, the average value, or the like with respect to the voxel values of the voxels through which each of the lines LNF, LNL, and LNR passes (see the steps S2 and S3 illustrated in FIG. 10). The line LNF extends from the enemy fighter aircraft in the forward direction, the line LNL extends from the enemy fighter aircraft in the leftward direction, and the line LNR extends from the enemy fighter aircraft in the rightward direction (see FIG. 12A).

Whether or not the strength parameter of the enemy fighter aircraft is equal to or smaller than a threshold value is determined (step S22). When it has been determined that the strength parameter is larger than the threshold value, the action probability table of the enemy fighter aircraft is set so that the enemy fighter aircraft moves in a direction that avoids the cloud based on the cloud densities DSF, DSL, and DSR within the lines LNF, LNL, and LNR (step S23). In the example illustrated in FIG. 12B, the action probability table (i.e., movement control parameter) is set as illustrated in FIG. 13B so that the enemy fighter aircraft moves in a direction that avoids the cloud that is present in the forward direction with respect to the enemy fighter aircraft, for example. In the example illustrated in FIG. 12C, the action probability table is set as illustrated in FIG. 13C so that the enemy fighter aircraft moves in a direction that avoids the cloud that is present in the leftward direction with respect to the enemy fighter aircraft, for example.

When it has been determined that the strength parameter is equal to or smaller than the threshold value, the action probability table of the enemy fighter aircraft is set so that the enemy fighter aircraft moves in the direction in which the cloud is present based on the cloud densities DSF, DSL, and DSR within the lines LNF, LNL, and LNR (step S24). In the example illustrated in FIG. 14A, the action probability table is set as illustrated in FIG. 14B so that the enemy fighter aircraft moves in the leftward direction in which the cloud is present, for example.

The action of the enemy fighter aircraft is determined based on the action probability table that has been set as described above (step S25). Specifically, the action that is to be performed by the enemy fighter aircraft in each action phase is determined based on the action probability table. The process that controls the movement of the enemy fighter aircraft is then performed (step S26). Specifically, the process that controls the movement of the enemy fighter aircraft is performed so that the enemy fighter aircraft performs the action (e.g., forward movement, left turn, or right turn) that has been determined based on the action probability table.

2.5 Process that Displays Attack Support Display Object Using Cloud Density

In one embodiment of the invention, a display process that changes the display pattern of the attack support display object corresponding to the density information is performed, the attack support display object being displayed to the player when the player's moving object attacks the attack target. For example, the display state of the attack support display object is changed corresponding to the density information.

Figure 16A:
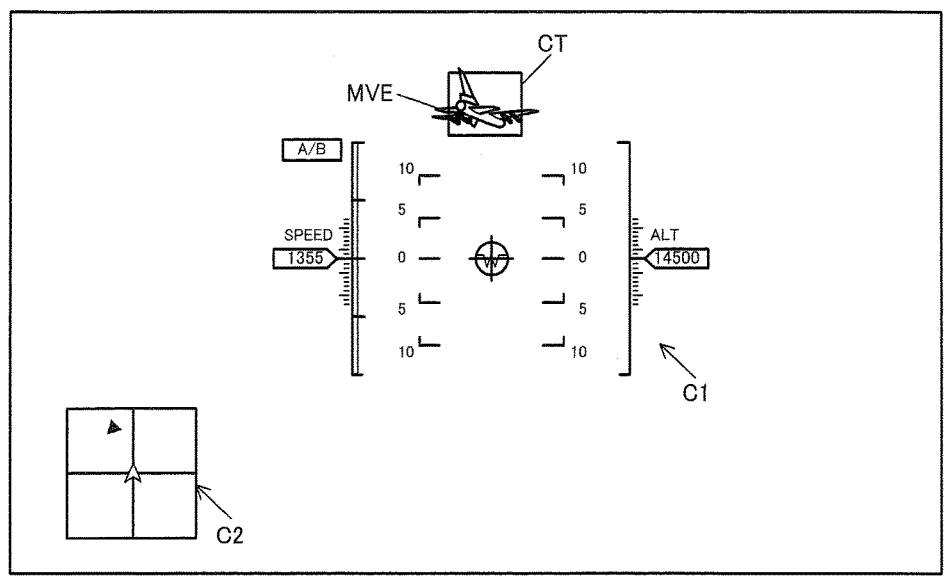
FIGS. 16A and 16B are views illustrating a method that displays an attack support display object using cloud density.

For example, FIG. 16A illustrates an example of a game screen according to one embodiment of the invention that is displayed as a cockpit view. In the example illustrated in FIG. 16A, the altitude, the attitude, the speed, and the cross hairs are displayed in the form of a head-up display (HUD) (see C1). A radar screen (display) that indicates the position of the player's fighter aircraft and the position of the enemy fighter aircraft is also displayed (see C2).

In the example illustrated in FIG. 16A, a container CT (enemy tracking cursor) is displayed as the attack support display object that is displayed to the player when the player's fighter aircraft attacks the enemy fighter aircraft MVE (attack target). The container CT is a display object (e.g., sprite) that is displayed to follow the enemy fighter aircraft MVE. The player can determine the position and the motion of the enemy fighter aircraft MVE by observing (visually tracking) the container CT. The container CT is displayed in the form of a frame image that surrounds the position of the enemy fighter aircraft MVE. Note that the color, the shape, and the like of the container CT may be changed when the enemy fighter aircraft MVE has been locked on by the player's fighter aircraft to notify the player that the enemy fighter aircraft MVE has been locked on.

In the example illustrated in FIG. 16A, the container CT is displayed in a normal state since a cloud having high density is not present between the player's fighter aircraft and the enemy fighter aircraft MVE. In the example illustrated in FIG. 16B, the display pattern (display state) of the container CT has been changed since a cloud having high density (concentration) is present between the player's fighter aircraft and the enemy fighter aircraft MVE (see FIG. 5). For example, the display pattern of the container CT is changed when it has been determined that the cloud density (e.g., the maximum cloud density) within the line that connects the player's fighter aircraft and the enemy fighter aircraft MVE is equal to or larger than a threshold value (e.g., 0.7 or more). For example, the container CT is displayed in a blinking manner (e.g., the container CT is repeatedly turned ON for 2 seconds, and turned OFF for 1 second).

Since the HUD in which the container CT is displayed is provided to the cockpit of the player's fighter aircraft, the display of the container CT within the HUD is normally not changed in view of the presence of a cloud. However, when a cloud having high density is present between the player's fighter aircraft and the enemy fighter aircraft MVE, the electronic sensitivity of the electronic devices of the player's fighter aircraft with respect to the enemy fighter aircraft MVE may decrease. Specifically, it may be difficult to electronically track the position of the enemy fighter aircraft MVE.

Figure 16B:
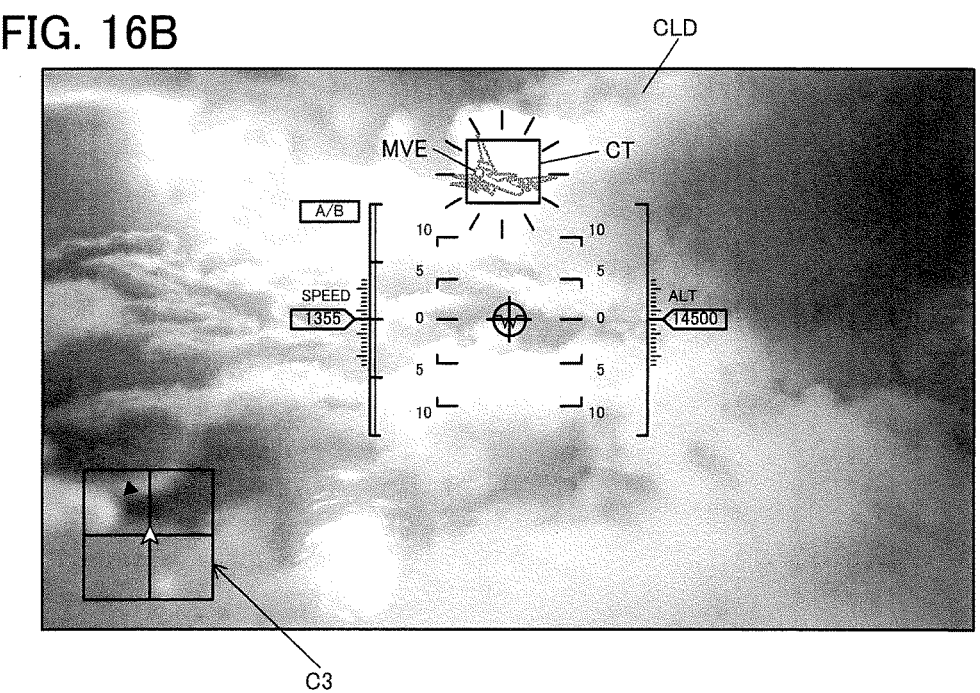

In one embodiment of the invention, the display pattern of the container CT is changed as illustrated in FIG. 16B when it has been determined that a cloud having high density is present between the player's fighter aircraft and the enemy fighter aircraft MVE in order to display (render or implement) such a situation during the game. For example, it is possible to allow that player to realize a situation in which it is difficult to track the enemy fighter aircraft MVE due to a decrease in electronic sensitivity by displaying the container CT in a blinking manner. This makes it possible to allow the player to experience improved virtual reality. When the container CT is displayed in a blinking manner, it is difficult for the player to visually track the enemy fighter aircraft MVE. Therefore, it is possible to create a situation in which the enemy fighter aircraft MVE runs into the cloud, and it is difficult for the player to attack the enemy fighter aircraft MVE.

Note that the attack support display object of which the display pattern is changed based on the cloud density is not limited to the container CT that is displayed within the HUD. For example, the display pattern of the radar screen (see C3 in FIG. 16B) may be changed based on the cloud density. For example, the display state of an icon that represents the enemy fighter aircraft that is displayed on the radar screen is changed. For example, the icon that represents the enemy fighter aircraft is displayed in a blinking manner. The attack support display object may be a display object (e.g., lock-on cursor) that is displayed within a HUD, or may be a display object other than a display object that is displayed within a HUD. For example, various sprite display objects may be used as the attack support display object. The display pattern of the attack support display object need not necessarily be changed in a blinking manner (see above). For example, various image properties (e.g., color, brightness, shape, or texture) of the attack support display object may be changed based on the cloud density. The display process that changes the display pattern of the attack support display object may be a process that selects a pattern that corresponds to the density information from a plurality of patterns provided in advance. For example, a plurality of patterns that differ in translucency or the like may be provided corresponding to the attack support display object (e.g., container), and a pattern that corresponds to the density information may be selected from the plurality of patterns.

Figure 17:
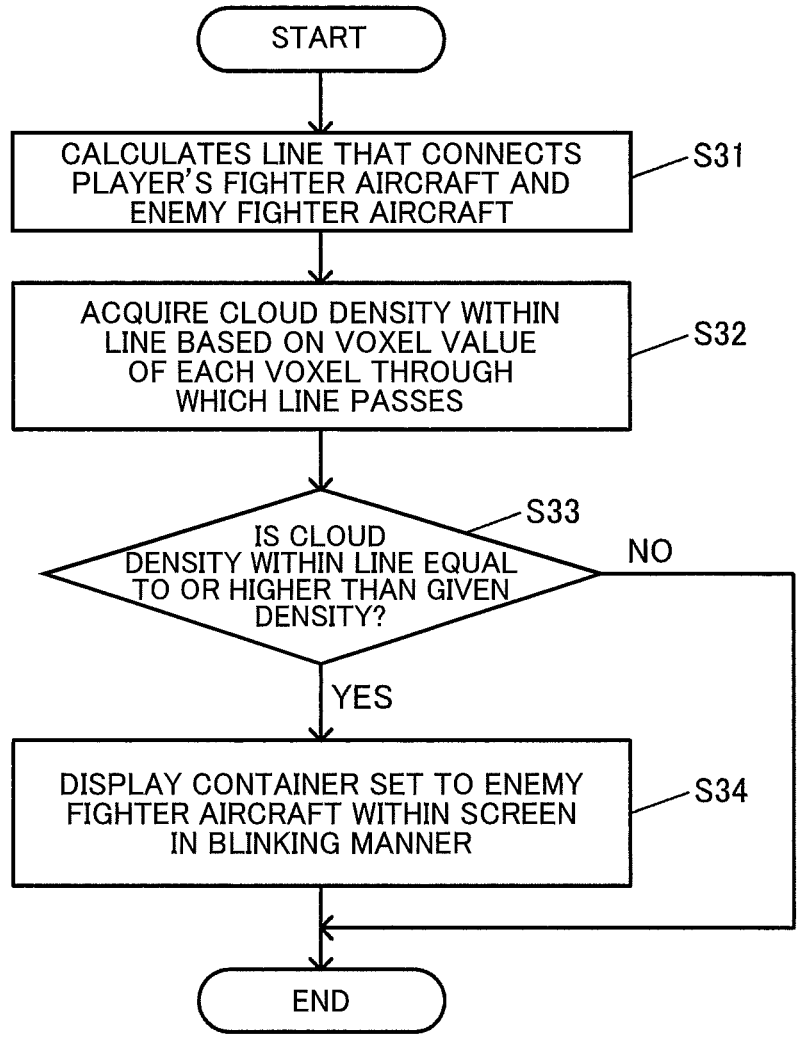
FIG. 17 is a flowchart illustrating a process that displays an attack support display object using cloud density.

FIG. 17 is a flowchart illustrating an example of the process (display process) that displays the attack support display object using the cloud density. A line that connects the player's fighter aircraft and the enemy fighter aircraft is calculated (as described with reference to FIG. 5, for example) (step S31). The cloud density within the line is acquired based on the voxel value of each voxel through which the line passes (step S32). For example, the cloud density within the line is set based on the maximum value, the integrated value, or the average value within respect to the voxel values of a plurality of voxels through which the line passes.

Whether or not the cloud density within the line is equal to or higher than a given density is then determined (step S32). When it has been determined that the cloud density within the line is equal to or higher than the given density, a container that is set to the enemy fighter aircraft within the screen is displayed in a blinking manner (steps S33 and S34). For example, the container CT that tracks the enemy fighter aircraft MVE is displayed in a blinking manner (see FIG. 16B) to notify the player that the electronic sensitivity has decreased.

2.6 Modifications

Figure 18:
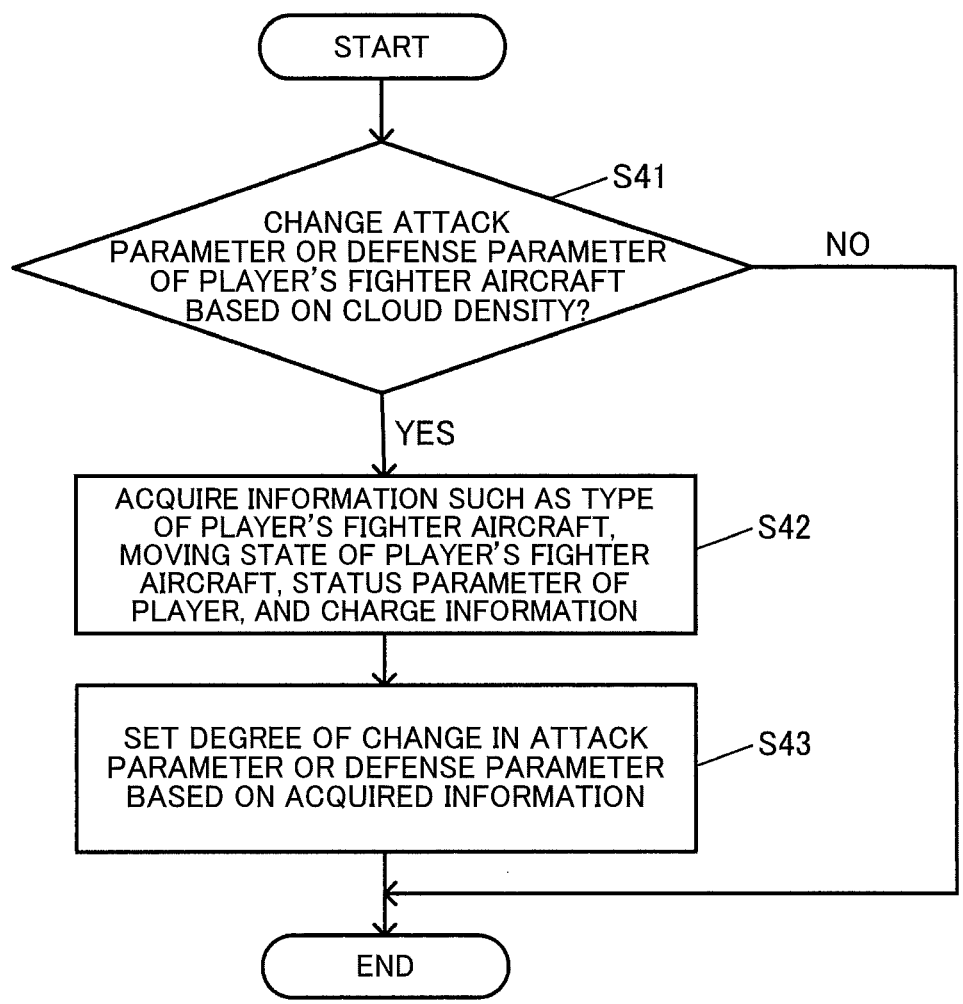
FIG. 18 is a flowchart illustrating a modification of one embodiment of the invention.

Various modifications of the embodiments of the invention are described below. For example, the embodiments of the invention may be modified so that the degree of change in the attack parameter or the defense parameter based on the density information may be set based on the type of moving object, the moving state of the moving object, the status parameter of the player who operates the moving object, the charge information about the player, and the like. FIG. 18 is a flowchart illustrating an example of the process according to this modification.

Whether or not to change the attack parameter or the defense parameter of the player's fighter aircraft based on the cloud density is determined (step S41). For example, it is determined to change the attack parameter of the player's fighter aircraft when the cloud density (e.g., maximum voxel value) within the line that connects the player's fighter aircraft and the enemy fighter aircraft (see FIG. 5) has exceeded a threshold value. When the player's fighter aircraft is tracked by the enemy fighter aircraft (as described later), it is determined to change the defense parameter of the player's fighter aircraft when the cloud density within the line that connects the enemy fighter aircraft and the player's fighter aircraft has exceeded a threshold value.

When it has been determined to change the attack parameter or the defense parameter, information such as the type (e.g., model and shape) of the player's fighter aircraft, the moving state (e.g., speed and acceleration) of the player's fighter aircraft, the status parameter (e.g., level) of the player, and the charge information is acquired (step S42). The degree of change in the attack parameter or the defense parameter of the player's fighter aircraft is set based on the acquired information (step S43). For example, the amount of change in the attack parameter or the defense parameter is variably set based on the type of the player's fighter aircraft, the moving state of the player's fighter aircraft, the status parameter of the player, the charge information, or the like.

For example, when the player's fighter aircraft is a special model (rare model), the amount of change (e.g., decrease) in the attack parameter or the defense parameter is significantly decreased or increased. The amount of change in the attack parameter or the defense parameter is caused to differ between a case where the moving speed of the player's fighter aircraft is high and a case where the moving speed of the player's fighter aircraft is low. For example, when the speed (or acceleration) of the player's fighter aircraft is high in a state in which the player's fighter aircraft tracks the enemy fighter aircraft, the amount of decrease in the attack parameter (e.g., angle of view and turning performance) based on the cloud density is decreased. For example, when the speed (or acceleration) of the player's fighter aircraft is high in a state in which the enemy fighter aircraft tracks the player's fighter aircraft, the amount of increase in the defense parameter (e.g., angle of view and turning performance) based on the cloud density is increased.

The amount of change in the attack parameter or the defense parameter is changed (caused to differ) corresponding to the status parameter (e.g., level) of the player. For example, when the level of the player is high, the amount of decrease in the attack parameter when the player's fighter aircraft tracks the enemy fighter aircraft is increased in order to increase the difficulty level of the game. Alternatively, the amount of increase in the defense parameter when the player's fighter aircraft is tracked by the enemy fighter aircraft is decreased. The amount of change in the attack parameter or the defense parameter is changed (caused to differ) corresponding to the charge information about the player. For example, when the amount charged to the player is large, the amount of decrease in the attack parameter when the player's fighter aircraft tracks the enemy fighter aircraft is decreased in order to give the player an advantage. Alternatively, the amount of increase in the defense parameter when the player's fighter aircraft is tracked by the enemy fighter aircraft is increased.

Figure 19A:
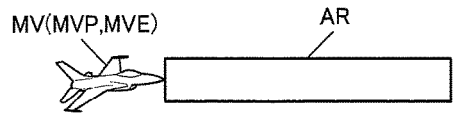
FIGS. 19A to 19E are views illustrating a modification of one embodiment of the invention.
Figure 19B:
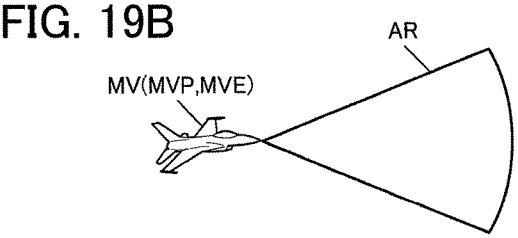
Figure 19C:
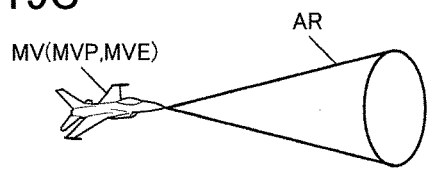

Although an example in which a line extends from the moving object has been mainly described above, a range may extend from the moving object in a given direction. Specifically, the attack parameter, the defense parameter, or the movement control parameter of the moving object may be set based on the density information about the assemblage of particles within a range that extends from the moving object in a given direction. FIGS. 19A to 19C illustrate an example of a range AR that extends from the moving object MV (player's fighter aircraft MVP or enemy fighter aircraft MVE) in a given direction.

In the example illustrated in FIG. 19A, the range AR is set to include the line LN illustrated in FIG. 5. The range AR is a rectangular range that extends from the moving object MV in a given direction (e.g., a direction that connects the player's fighter aircraft and the enemy fighter aircraft (e.g., forward direction, rightward direction, or leftward direction). For example, the range AR has a width in a direction that intersects the given direction. The range AR may be a three-dimensional range (e.g., rectangular parallelepiped). In this case, the density information (e.g., cloud density) within the range AR is set using the voxel values of the voxels through which the line LN passes, and the voxel values of the voxels through which the range AR passes (see FIG. 9).

In the example illustrated in FIG. 19B, the range AR has a fan-like shape. For example, the range AR is set so that the width in a direction that intersects the given direction is small at a position near the moving object MV, and is large at a position away from the moving object MV. In the example illustrated in FIG. 19C, the range AR has a conical shape. The range AR illustrated in FIG. 19C is a three-dimensional range.

Note that the shape of the range AR is not limited to those illustrated in FIGS. 19A to 19C. The range AR may have various other shapes. For example, the range AR may have a two-dimensional shape (e.g., a polygonal shape such as a triangular shape, or a two-dimensional shape other than a polygonal shape) other than the rectangular shape and the fan-like shape illustrated in FIGS. 19A and 19B. The range AR may have a three-dimensional shape (e.g., a polyhedral shape (e.g., rectangular parallelepiped, triangular prism, or hexagonal cylinder), or a convex shape) other than the conical shape illustrated in FIG. 19C.

Figure 19D:
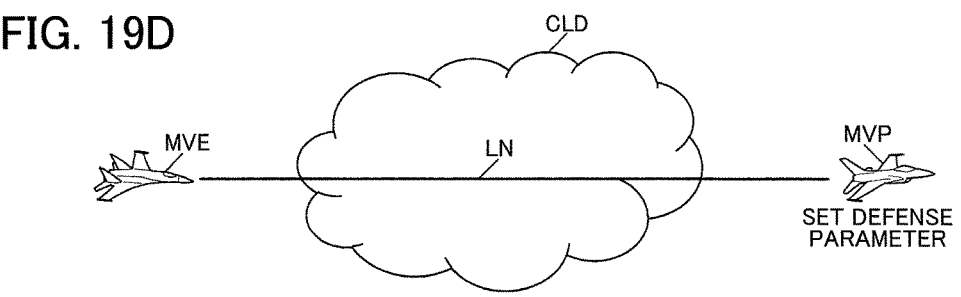

Although the method that sets the attack parameter of the moving object based on the density information has been mainly described above, the defense parameter of the moving object may be set based on the density information. In the example illustrated in FIG. 19D, the enemy fighter aircraft MVE tracks the player's fighter aircraft MVP in order to attack the player's fighter aircraft MVP, differing from the example illustrated in FIG. 5. In this case, the defense parameter of the player's fighter aircraft MVP is set based on the cloud density (density information) within the line (range) that connects the enemy fighter aircraft MVE (computer-operated moving object) and the player's fighter aircraft MVP. For example, the defense capability with respect to the attacking object (e.g., missile) that is launched from the enemy fighter aircraft MVE is increased when the cloud density is high. In this case, a missile launched from the enemy fighter aircraft MVE does not easily hit the player's fighter aircraft MVP, or the amount of damage (e.g., a decrease in strength parameter) to the player's fighter aircraft MVP is decreased when a missile launched from the enemy fighter aircraft MVE has hit the player's fighter aircraft MVP. Examples of the defense parameter that is set based on the density information include a defense capability, durability (strength), a capability to avoid an attacking object (capability to avoid tracking by an attacking object), a strength recovery capability, and the like.

Figure 19E:
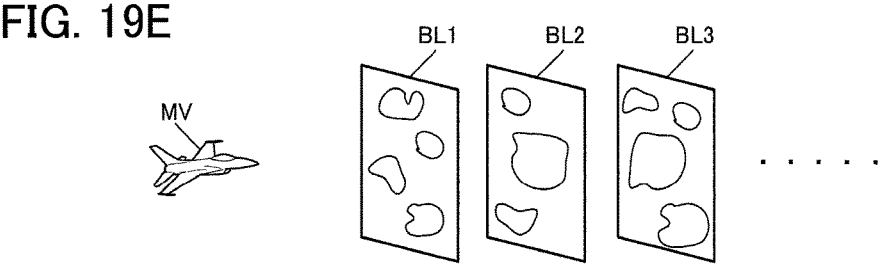

Although an example in which the image of the assemblage of particles such as a cloud is generated using the volume rendering process has been mainly described above, the embodiments of the invention are not limited thereto. In the example illustrated in FIG. 19E, an image of clouds is generated using billboards BL1, BL2, BL3, . . . in which an image of clouds is drawn on a polygon placed so as to intersect the line of sight. When generating an image in which the moving object MV flies through clouds using such a billboard (polygon in a broad sense), the billboard may be caused to disappear immediately before the moving object MV reaches the billboard, for example. In the example illustrated in FIG. 19E, the cloud density information may be linked to each of the billboards BL1, BL2, BL3, . . . , and the attack parameter, the defense parameter, or the movement control parameter of the moving object MV may be set based on the density information. For example, the attack parameter, the defense parameter, or the movement control parameter of the moving object MV may be set based on the density information linked to the billboard (polygon) that intersects a line or a range that extends from the moving object MV in a given direction.

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of the invention. Any term (e.g., player's moving object, computer-operated moving object, assemblage of particles, density information about an assemblage of particles, attacking object, and attack support display object) cited with a different term (e.g., player's fighter aircraft, enemy fighter aircraft, cloud, cloud density, missile, and container) having a broader meaning or the same meaning at least once in the specification and the drawings can be replaced by the different term in any place in the specification and the drawings. The object space setting process, the process that moves the moving object, the process that sets the parameter based on the density information, the process that displays the display object, the rendering process, and the like are not limited to those described above in connection with the embodiments. Methods equivalent to those described above in connection with the embodiments are intended to be included within the scope of the invention.

What is claimed is:

1. An image generation system comprising:
a processor comprising hardware, the processor being configured to implement:
an object space setting process that performs a process that places a plurality of objects including a moving object in an object space;
a moving object calculation process that performs a movement process that moves the moving object in the object space;
a parameter process that performs a process that sets at least one of an attack parameter, a defense parameter, and a movement control parameter of the moving object based on density information about at least one of: an assemblage of particles within a line or a range that extends from the moving object in a given direction, and the assemblage of particles at a position of the moving object, the assemblage of particles being represented as an image of an indefinite shape in which a number of particulate objects gather together; and
an image generation process that generates an image viewed from a given viewpoint in the object space.

2. The image generation system as defined in claim 1, wherein the processor implements the parameter process that performs a process that sets the attack parameter of the moving object based on the density information within a line that connects the moving object and an attack target of the moving object.

3. The image generation system as defined in claim 1, wherein the attack parameter is a performance parameter related to at least one of: tracking performance of an attacking object that is launched from the moving object, lock-on performance of the attacking object, and moving performance of the attacking object.

4. The image generation system as defined in claim 1, wherein the processor implements the parameter process that performs a process that sets the movement control parameter of the moving object based on the density information at the position of the moving object.

5. The image generation system as defined in claim 1, wherein
the processor implements the moving object calculation process that performs a process that moves a computer-operated moving object as the moving object, the computer-operated moving object moving in the object space based on an operation performed by a computer, and the processor implements the parameter process that performs a process that sets the movement control parameter of the computer-operated moving object based on the density information within first to Nth lines that respectively extend from the computer-operated moving object in first to Nth directions.

6. The image generation system as defined in claim 5, wherein the processor implements the parameter process that performs a process that sets the movement control parameter so that the computer-operated moving object moves in a direction that avoids a direction that corresponds to a line among the first to Nth lines for which it has been determined that density represented by the density information is high.

7. The image generation system as defined in claim 6, wherein the processor implements the parameter process that performs a process that sets the movement control parameter so that the computer-operated moving object moves in the direction that corresponds to the line for which it has been determined that the density represented by the density information is high, when it has been determined that status of the computer-operated moving object is in a given state.

8. The image generation system as defined in claim 1, wherein
the processor implements the moving object calculation process that performs a process that moves a player's moving object as the moving object, the player's moving object moving in the object space based on operation information input by a player, and
the processor implements the image generation process that performs a display process that changes a display pattern of an attack support display object corresponding to the density information, the attack support display object being displayed to the player when the player's moving object attacks an attack target.

9. The image generation system as defined in claim 1, wherein the processor implements the image generation process that performs a process that generates an image of the assemblage of particles based on the density information.

10. The image generation system as defined in claim 9, wherein
the processor implements the image generation process that performs the process that generates the image of the assemblage of particles by a volume rendering process that uses a voxel value, and
the processor implements the parameter process that acquires the voxel value used for the volume rendering process as the density information about the assemblage of particles.

11. The image generation system as defined in claim 1, wherein the processor implements the parameter process that sets a degree of change in the attack parameter or the defense parameter based on the density information based on at least one of a type of the moving object, a moving state of the moving object, a status parameter of a player who operates the moving object, and charge information about the player.

12. An image generation method comprising:
an object space setting process that performs a process that places a plurality of objects including a moving object in an object space;
a moving object calculation process that performs a movement process that moves the moving object in the object space;

a parameter process that performs a process that sets at least one of an attack parameter, a defense parameter, and a movement control parameter of the moving object based on density information about at least one of: an assemblage of particles within a line or a range that extends from the moving object in a given direction, and the assemblage of particles at a position of the moving object, the assemblage of particles being represented as an image of an indefinite shape in which a number of particulate objects gather together;

an image generation process that generates an image viewed from a given viewpoint in the object space.

13. A non-transitory computer-readable information storage medium storing a program that causes a computer to execute the image generation method as defined in claim 12.

14. An image generation system comprising:
a processor comprising hardware, the processor being configured to implement:
   an object space setting process that performs a process that places a plurality of objects including a computer-operated moving object in an object space;
   a moving object calculation process that performs a movement process that moves the computer-operated moving object in the object space based on an operation performed by a computer;
   a parameter process that performs a process that sets at least one of an attack parameter, a defense parameter, and a movement control parameter of the computer-operated moving object based on density information within first to Nth lines that respectively extend from the computer-operated moving object in first to Nth directions; and
   an image generation process that generates an image viewed from a given viewpoint in the object space.

15. The image generation system according to claim 1, wherein the assemblage of particles is represented as an image selected from at least one of: a cloud, fog, dust, smoke, water vapor, and a sandstorm.

16. The image generation system according to claim 14, wherein the density information is density information that is based on at least one of: an assemblage of particles within a line or a range that extends from the moving object in a given direction, and the assemblage of particles at a position of the moving object.

17. An image generation method comprising:
performing an object space setting process that performs a process that places a plurality of objects including a computer-operated moving object in an object space;
performing a moving object calculation process that performs a movement process that moves the computer-operated moving object in the object space based on an operation performed by a computer;
performing a parameter process that performs a process that sets at least one of an attack parameter, a defense parameter, and a movement control parameter of the computer-operated moving object based on density information within first to Nth lines that respectively extend from the computer-operated moving object in first to Nth directions; and
performing an image generation process that generates an image viewed from a given viewpoint in the object space.

18. An image generation system comprising:
a processor comprising hardware, the processor being configured to implement:
   an object space setting process that performs a process that places a plurality of objects including a moving object in an object space;
   a moving object calculation process that performs a movement process that moves the moving object in the object space;
   a parameter process that performs a process that sets at least one of an attack parameter, a defense parameter, and a movement control parameter of the moving object based on density information about at least one of: an assemblage of particles within a line or a range that extends from the moving object in a given direction, and the assemblage of particles at a position of the moving object; and
   an image generation process that generates an image viewed from a given viewpoint in the object space, wherein
      the processor implements the image generation process that performs a process that generates an image of the assemblage of particles based on the density information,
      the processor implements the image generation process that performs the process that generates the image of the assemblage of particles by a volume rendering process that uses a voxel value, and
      the processor implements the parameter process that acquires the voxel value used for the volume rendering process as the density information about the assemblage of particles.

* * * * *